US012253910B2

(12) United States Patent
Merchant et al.

(10) Patent No.: US 12,253,910 B2
(45) Date of Patent: Mar. 18, 2025

(54) SYSTEMS, METHODS, AND COMPUTER READABLE MEDIA FOR INTELLIGENT MUTATING ADMISSION WEBHOOK

(71) Applicant: DEEPFACTOR, INC., San Jose, CA (US)

(72) Inventors: Rizwan Merchant, Fremont, CA (US); Scott Oberg, Paso Robles, CA (US); Vikas Wadhvani, Bengaluru (IN); Rutuja Phase, Pune (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/315,077

(22) Filed: May 10, 2023

(65) Prior Publication Data

US 2024/0378107 A1 Nov. 14, 2024

(51) Int. Cl.
*G06F 11/00* (2006.01)
*G06F 11/07* (2006.01)

(52) U.S. Cl.
CPC ...... *G06F 11/0793* (2013.01); *G06F 11/0721* (2013.01)

(58) Field of Classification Search
CPC ............. G06F 11/0793; G06F 11/0721; G06F 11/079; G06F 11/0727; G06F 11/1492; G06F 11/3438
See application file for complete search history.

(56) References Cited

U.S. PATENT DOCUMENTS

2021/0200814 A1\* 7/2021 Tal ..................... G06F 16/90335
2023/0388369 A1\* 11/2023 Mehrotra ................ H04L 67/10

\* cited by examiner

*Primary Examiner* — Katherine Lin
(74) *Attorney, Agent, or Firm* — Van Court & Aldridge LLP

(57) ABSTRACT

Systems, methods, and computer-readable media for intelligent webhook are described herein. The intelligent webhook can insert code into one or containers associated with an application being deployed by an orchestration service. The code enables the intelligent webhook to monitor operations, including startup, of a container mutated to include the code. The intelligent webhook has knowledge of whether a mutated container failed to startup in a prior instance, and if it fails, the intelligent webhook can insert a modified version of the code and/or adjust resource limit constraints to facilitate mutation of a container scheduled to be deployed with an application.

16 Claims, 21 Drawing Sheets

Observe Namespace

Let's get you started by adding a new namespace

① Namespace ─────── ② SCA & SBOM ─────── ③ Runtime Security

Include Pods

Selector ⓘ : ○ All ◉ Custom Match Expressions

| Label* | Operator* | |
|---|---|---|
| my label | Exists ▼ | |

| Label* | Operator* | Value* |
|---|---|---|
| my other label | In ▼ | "some_value"⊗ |

Enter Value and Press "Enter" to Accept

[ + Add Another Match Expressions ]

Exclude Pods

Regular expressions for pod names ⓘ

( test_pod* ⊗ )

Enter Value and Press "Enter" to Accept

Regular expressions for container image paths ⓘ

Enter Value and Press "Enter" to Accept

Alert Policy:

| Built-in Policy- Standard ▼ |
|---|

▼ Advanced Options

[ Cancel ]  [ Previous ] [ Next ]

FIG. 12B

SYSTEMS, METHODS, AND COMPUTER READABLE MEDIA FOR INTELLIGENT MUTATING ADMISSION WEBHOOK

TECHNICAL FIELD

This can relate to systems, methods, and computer-readable media for a webhook, and more particularly, to an intelligent mutating admission webhook.

BACKGROUND

Webhooks enable applications to communicate with each other and other internet based services. A webhook in web development can be a method of augmenting or altering the behavior of a web page or web application with custom callbacks. These callbacks may be maintained, modified, and managed by third-party users and developers who may not necessarily be affiliated with the originating website or application. Webhooks are an essential tool used in Internet applications and services, similar to how application programming interfaces (APIs) are also used in various applications and services. A webhook is sometimes referred to as inverse API.

Webhooks require proper configuration to operate as intended. For example, the webhook should be programmed with the correct data (e.g., URL) and contain the proper security credentials (e.g., authorization and authentication). Conventional tools for testing webhooks and how such webhooks operate in an application environment are rudimentary and provide very limited information.

Accordingly, what is needed is a more efficient and practical way to track and analyze webhooks and how they operate within an application.

SUMMARY

Systems, methods, and computer-readable media for an intelligent mutating admission webhook are provided. The intelligent webhook can insert code into one or containers associated with an application being deployed by an orchestration service. The code enables the intelligent webhook to monitor operations, including startup, of a container mutated to include the code. The intelligent webhook has knowledge of whether a mutated container failed to startup in a prior instance, and if it fails, the intelligent webhook can insert a modified version of the code and/or adjust resource limit constraints to facilitate mutation of a container scheduled to be deployed with an application.

This Summary is provided to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The above and other aspects of the disclosure, its nature, and various features will become more apparent upon consideration of the following detailed description, taken in conjunction with the accompanying drawings, in which like reference characters may refer to like parts throughout, and in which:

FIGS. 10A-10G show different UI screenshots in a platform that enables a user to define various configurations for a webhook according to an embodiment.

FIGS. 12A-12C show different UI screenshots of setting up a webhook in a TIAP according to an embodiment.

DETAILED DESCRIPTION

Figure 1:
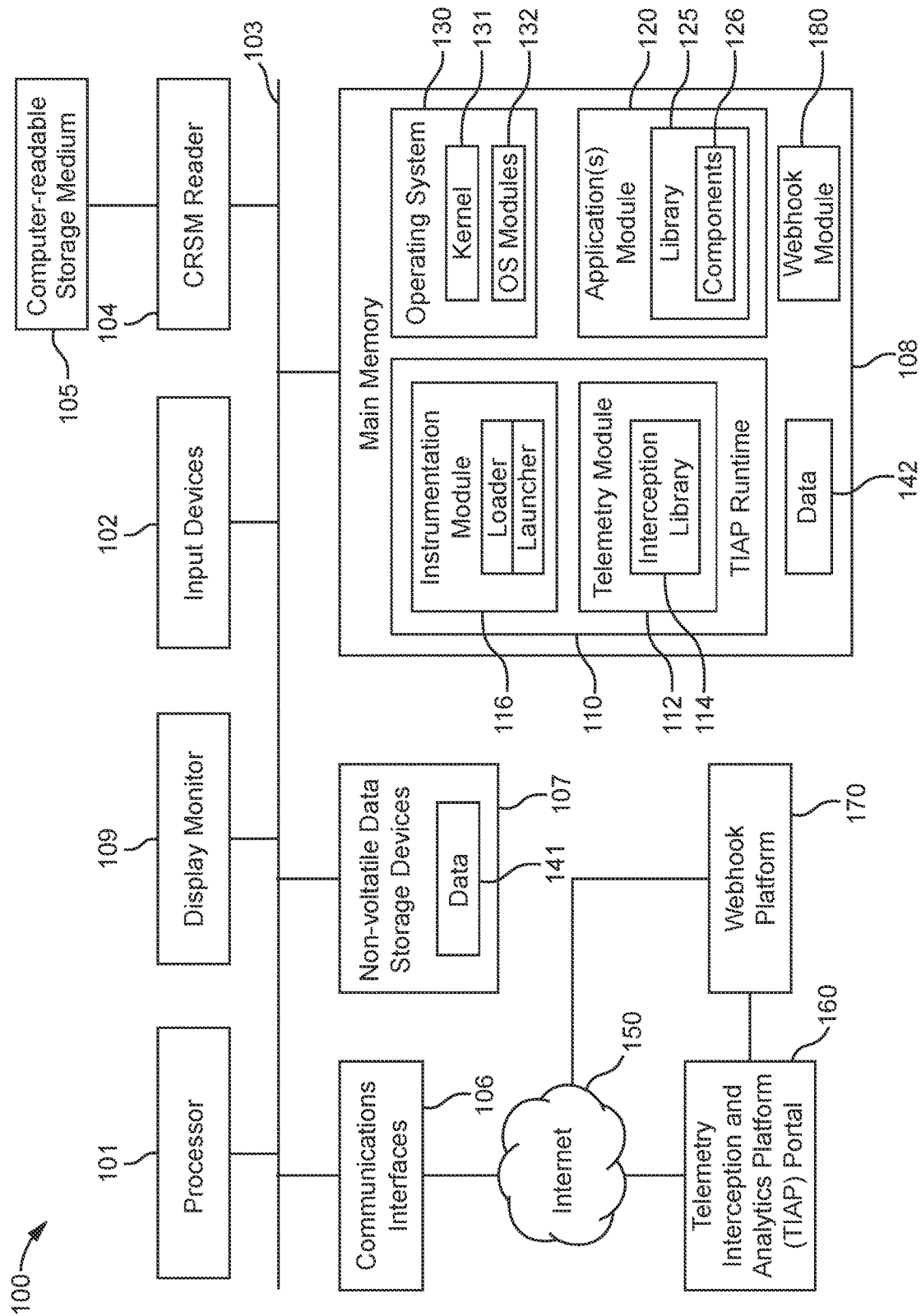
FIG. 1 shows a schematic diagram of an example computer or server in accordance with an embodiment.

Systems, methods, and computer-readable media for are provided and described with reference to FIGS. 1-12C. Intelligent mutable admission control webhooks and how such webhooks operate in conjunction with a telemetry interception and analysis platform are discussed herein.

Modern applications can be deployed in containers (e.g., Docker containers) to assist with dependency management, packaging, and deployment concerns. Containers allow a developer to package all required dependencies with the application, so that there is less risk when deploying the application in alternate environments. Packaging dependencies with the application ensures that if incompatible libraries are found on the system where the application is being deployed, only the approved/certified libraries are loaded. Packaging applications this way also provides the capability for different versions of the same dependency to be simultaneously used by different applications.

When applications are packaged in containers, a container image is typically created at the time the application is built. This container image is published to a container registry, which allows end users and/or customers to download that image and create a local instance of that container image, which contains all the dependencies required for the application to run.

An application may include multiple containers that work together in concert to provide the functionality of the entire application as a whole. When containers are deployed in a customer/user's environment, it is possible that many containers can be simultaneously running, as required by the application.

Container orchestration is a term that refers to the management of containers on a host (virtual machine or physical machine). Since there may be possibly many containers running, it is important to limit the resources consumed by any single container, so that sufficient resources are available to run all the required containers. Containers that exceed their resource limits might be terminated by the container orchestration software.

Further, containers may need to be replicated (or scaled) if the application load becomes too great. For example, a container orchestration software may periodically monitor the performance of a database container, and if database queries are taking too long to complete, it may choose to start a second (or third, etc.) instance of that database container on a host to load balance. The container orchestration software is typically responsible for acting as a network intermediary in this scenario, to provide the round-robin load balancing characteristics. Containers scaled in this way may be started on the same host or a different host, based on available host resources.

A commonly used container orchestration platform is Kubernetes (K8s). Kubernetes provide orchestration capabilities for containers (which K8s refer to as 'pods'), providing resource management, resource limiting, scheduling, scaling (replicating) pods, and the network fabric between pods. Kubernetes attempt to reach a state of performance as defined by a user and does this by selectively mutating containers, admissions to control which containers and mutated containers are used, and whether to shut a container down.

When a software developer creates a container image (or multiple images) including their applications, the consumer/customer of that product may choose to deploy the application using K8s. Typically, if an organization has adopted k8s, they generally have in place certain rules/resource limits that must be adhered to (to avoid runaway resource constraints), and also likely have certain application naming concerns (using k8s namespaces or clusters to partition similar applications into private areas).

It may not always be possible to set all desired configuration parameters as described above using K8s itself. For example, if a container image containing part of an application needs to have a configuration variable set, that may only be possible from within the container image. If the developer did not foresee his or her application being used in a K8s environment, that configuration parameter may not be alterable, leading to misconfigurations or undesired effects in the customer's deployment. This is a common issue with K8s. K8s does offer a solution in the form of an API called the mutating admission webhook. The webhook is a piece of code that is afforded the opportunity to alter (mutate) a container image that is about to be started by K8s. The webhook can set configuration variables, alter files inside the container image, or any other desired change, to allow the container image(s) it manages to be acceptably deployed in the customer's environment. The webhook is usually configurable externally, to allow the customer to decide what needs to be changed inside container images managed by the webhook. The webhook can insert itself into the Kubernetes work flow and the webhook can act as an admission controller for allowing a container or mutated container to be used and can mutate a container as needed.

Embodiments discussed herein refer to an intelligent webhook that is useful when used in conjunction with software products that offer observability or runtime analysis. These software products might include security products, performance monitoring products, network analytics products, and so on. As a specific example, the intelligent webhook may operate with a telemetry interception and analysis platform (TIAP), which is briefly discussed below and also described in applicant's commonly owned U.S. Pat. Nos. 11,151,009, 11,0366,606, and 11,243,861, the disclosures of which are incorporated by reference herein in their entireties. Embodiments discussed herein provide several advantages over the existing state of the art. For example, the intelligent webhook can intelligently insert monitoring code into a container by mutating that container to include the monitoring code. Performing intelligent code insertion implies validating that the container image being mutated is compatible with the software product (e.g., application). If mutation of the container is going to result in incompatibility issues, then the webhook will not mutate the container and inform the operator of the incompatibility issue.

As another example, the intelligent webhook can monitor the health and state of a container that has been mutated to include the inserted code and any other code deemed necessary by the Kubernetes at various instrumentation stages. After the code is inserted and the mutated contained is used by the application (e.g., at a first instrumentation stage), feedback from the TIAP can indicate whether the inserted code affected operation of the application. Alternatively, if the application crashes, such a crash may be detected by the webhook and the webhook can take this into account when it performs a subsequent mutation. If the application is affected by the inserted code (e.g., because it crashed) or the TIAP reports performance issues, the webhook module can run additional diagnostics on the mutated code before passing it on to the application (e.g., as part of a second instrumentation stage). If the mutated container still causes an issue for the application, the webhook module can inform the user that webhook code is not compatible with the container.

The webhook also has the ability to ability to back off mutation requests if either of the first and second instrumentation variants thereof or more fail (e.g., the container image is incompatible with K8s or the addition of the monitoring software has caused crashes or performance overhead issues).

The webhook may have the ability to automatically alter (increase) container resource limits defined by the customer to account for any additional overhead required by the monitoring product. For example, a container resource limit may be set to 1 gig of memory, but the addition of the webhook monitoring code resulted in 1.01 gig of memory being used, and as a result, the container could be shut down by the K8s. With the webhook's ability to increment container resource limitation, K8s pre-emptive shutdown of containers can be avoided. In addition, the intelligent webhook can keep track of resource changes requested for a given container and The intelligent webhook can enable a user to customize how the webhook's monitoring code is incorporated into a contained, how many times a mutated container is passed to an application, how resources limits are altered, or anything else a user may want to control.

The webhook can be remotely configured. For example, the webhook can authenticate with a TIAP and retrieve the desired configuration parameters from a central location. This means the operations/deployment team need not hand-edit or create individual configuration files.

The webhook can limit the sharing of security secrets required to operate on a container image. This can be important in scenarios where the webhook may require credentials to retrieve a container image, or in environments where the operations team has restricted K8s security models.

As defined herein, an alert is an abnormal condition that has been identified by an analytics service, based on a rule defined in an alert grammar.

As defined herein, an alert grammar includes a set of rules or parameters that are used to classify telemetry events obtained by a telemetry interception and analysis platform (TIAP) during operation of an application. The set of rules can be part of default set of rules provided by the TIAP, generated by a customer using the TIAP, heuristically learned rules created by machine learning, or any combination thereof. Other grammars may be used by the TIAP such as, for example, insight grammars, performance grammars, and warning grammars. Yet other grammars can include compliance grammars that search telemetry data for specific items such as, for example, credit card numbers, personally identifiable information (PII), addresses, bank accounts, etc.

As defined herein, an analytics service refers to one of many services handled by the TIAP and operative to perform analytics and telemetry events collected from an application. The analytics service may reference an alert grammar, insight grammar, performance grammar, or any other grammar to evaluate collected telemetry events.

As defined herein, an application refers to a top hierarchy level of monitoring by the TIAP. An application includes one or more component groups and represents a complete implementation of a top-line business application.

As defined herein, an API Server is a service that implements endpoint APIs (REST-based) for use by user interface (UI) and command line interface (CLI) tools.

As defined herein, a blueprint service analyzes recorded telemetries for one or more components and creates alert rules based on what has been seen. The blueprint service can be used to define behavioral blueprints that describe the intended behavior of an application (e.g., how an application should be behave, what it should do, and what it should not do).

As defined herein, a component is abstract definition of a single type of process known to the platform (e.g., "database" or "web server"). An application can operate using one or more components.

As defined herein, a component instance is an individual concrete example of a component, running on a specific host or a virtual machine (e.g., "database running on myserver.corp.com"). One or more instances may occur for each component.

As defined herein, a container is a standard unit of software that packages up code and all its dependencies so the application run quickly and reliably from one computer environment to another. Sometimes, a container is referred to as a pod.

As defined herein, a mutated container is a container that has had existing contents included therein that are modified, replaced, removed, or added to from its original form. Webhook embodiments discussed herein are able to modify containers to provide modified containers.

As defined herein, a component group is a collection of all instances of a given component (e.g., "all databases in application x").

As defined herein, a common vulnerability and exposure (CVE) is a system that provides a reference-method for publicly known information-security vulnerabilities and exposures. The National Cybersecurity FFRDC, operated by the Mitre Corporation, maintains the system, with funding from the National Cyber Security Division of the United States Department of Homeland Security. The system was officially launched for the public in September 1999. The Security Content Automation Protocol uses CVE, and CVE IDs are listed on MITRE's system as well as in the US National Vulnerability Database.

As defined herein, a CVE service is a platform service that periodically ingests CVE metadata and analyzes if any components are vulnerable to any known CVEs.

As defined herein, a dashboard can refer to a main screen of a TIAP portal UI.

As defined herein, an event service is a service that responds to telemetry event submissions using a remote call (e.g., gRPC or representational state transfer (REST)) and stores those events in an events database.

As defined herein, a housekeeping service is a service that periodically removes old data from logs and databases.

As defined herein, an insight is a noncritical condition that has been identified by the analytics service, based on a rule defined in a grammar. Insights are typically suggestions on how performance or other software metrics can be improved, based on observed telemetries.

As defined herein, Kubernetes refers to an open-source orchestration system for automating software deployments, scaling, and management.

As defined herein, a native library refers to a collection of components or code modules that are accessed by the application.

As defined herein, an interception library is created by the TIAP and is used to intercept API calls by the application and record the API calls as a telemetry event. The interception library can trampoline the original API call to the native library. The interception library can include the same functions of the native library or subset thereof and any proprietary APIs, but is associated with analysis platform and enables extraction of telemetry events related to operation of the application. When a function is called in the interception library, the telemetry event collection is performed and actual code in the native library is accessed to implement the function call.

As defined herein, a TIAP portal may refer to a Software as a Service (SaaS) or on-premise management server that host TIAP, including the dashboard and other TIAP UI screens, as well as any services required to set up installation of TIAP runtime code to monitor a customer's application, collect telemetry from the customer's application, and analyze collected telemetry.

As defined herein, a metric can refer to telemetry data collected that includes a numeric value that can be tracked over time (to form a trend).

As defined herein, a policy may be a security ruleset delivered to the runtime during initial communication/startup that describes desired tasks that are to occur when certain events are detected (e.g., block/allow/warn).

As defined herein, TIAP runtime or Runtime refers to a code module that runs within a loaded process' (component instance) address space and provides TIAP services (e.g., telemetry gathering, block actions, etc.).

As defined herein, a system loader is software tool that combines a customer's executable code with the runtime code to produce a binary output that is then used in place of the original executable code.

As defined herein, a trampoline or trampoline function is a runtime internal technique of hooking/intercepting API/library calls used by a component.

As defined herein, a trend is a change of metric values over time.

As defined herein, a vulnerability report associates a known vulnerability (e.g., a CVE) with a function, module, or object called by an application.

As defined herein, a warning is an abnormal condition that may not be critical, that has been detected by the analytics service, based on a rule defined in an alert/insight/warning grammar.

FIG. 1 shows a schematic diagram of an example computer or server in accordance with an embodiment. The computer or server of FIG. 1 may have less or more components to meet the needs of a particular application. As shown in FIG. 1, the computer may include a processor 101. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), communications interfaces 106 (e.g., network adapters, modems) for communicating over computer networks, one or more non-volatile data storage devices 107 (e.g., hard disk drive, optical drive, FLASH memory), and a main memory 108 (e.g., RAM). Software embodiments may be stored in a computer-readable storage medium 105 for reading into a non-volatile data storage device 107 or main memory 108. Data may be stored in data storage device 107 as data 141 or memory 108 as data 142. Software embodiments may also be received over a network, such as Internet 150 by way of a communications interface 106. In the example of FIG. 1, main memory 108 includes many different software modules. Note that these software modules may also run in data storage locations other than main memory.

The operating system 130 may include a UNIX-like operating system, such as the Linux operating system, iOS operating system, Mac OSX operating, or Windows operating system. Operating system 130 can include a kernel 131 and operating system modules 132. Operating system modules 132 can include components of operating system 130 other than kernel 131.

Other modules can include TIAP runtime module 110, telemetry module 112, instrumentation module 116, and applications module 120. Application module 120 may include computer-readable code for executing an application running on computer 100. The code may include executable code (e.g., a .exe file). Application module 120 may include a native library 125 (e.g., Libc.so) that is used during operation of the application. Native library 125 may include one or more components 126.

TIAP runtime module 110 may include computer readable code for executing operation of telemetry module 112 and instrumentation module 116, referred to herein as TIAP runtime or TIAP runtime code. TIAP runtime module 110 may include the TIAP runtime operative to collect telemetry events and provide the collected telemetry events to TIAP portal 160 via Internet 150.

Telemetry module 112 can include computer-readable code that is operative to intercept application programming interface (API) calls originating from the application at the library level within the software stack and capture such calls as telemetry events that are provided to TIAP 160 for further analysis. Telemetry module 112 may include an interception library 114. Interception library 114 may include interception code and trampoline functions corresponding to each component or API called by the application. The TIAP runtime can interpose on any function in any library used by any component by inserting interception hooks or trampoline functions into the application's dependency chain (e.g., IAT/PLT/GOT). These trampoline functions redirect control flow from the native library API functions to the TIAP runtime, which then collects information about the API request (parameters, call stack information, performance metrics, etc.) as telemetry events, and then passes the original call to the native library. The interception code is responsible for collecting the parameters needed for the telemetry event. Telemetry events can be continually monitored by the TIAP runtime. Each component instance is continually monitored by the TIAP runtime and the desired telemetry events are captured and sent to TIAP portal 160. Telemetry events can be collected into batches and periodically sent to the TIAP portal for later analysis. The batching capability of the platform runtime can be further subdivided into prioritized batches—this entails creating multiple event queues that are sent with varying priorities to TIAP portal 160. This subdivision is useful in scenarios where the runtime is only allotted a small amount of CPU/memory/network bandwidth (as to not interfere with efficient application execution). In the case where events may be dropped (due to not having sufficient resources), the TIAP runtime can instead collect a count of "missed events" that can be later communicated to the management platform when resources are available. This count provides the system administrator with a sense of how many events may be missing from the overall report provided by TIAP portal 160.

Instrumentation module 116 may be operative to load or package the necessary files and/or library associated with an application with files and/or library associate with platform 118 into a loader, launcher, or executable file that enables telemetry module 112 to extract telemetry events from the application during TIAP runtime.

TIAP portal 160 may perform analytics on the collected telemetry events and generate visuals for display to users of computer 100 based on the analytics obtained from the analysis of the application.

Webhook platform 170 may enable a user to define an intelligent webhook according to embodiments discussed herein. Webhook platform 170 may be integrated with or communicate with TIAP portal 160 or it can run independently thereof and can communicate with an application via Internet 150. In some embodiments, webhook platform 170 may provide a user interface that enables a user to define parameters of an intelligent webhook and observe analytics derived from deployment of the webhook. If desired, the user interface for webhook platform 170 may be include as part of the user interface with TIAP portal 160.

Webhook module 180 may be responsible for controlling admission of containers or mutated containers for use by the application and for mutating a container. Webhook module 180 may also be able to change resource allocations as needed if, for example, a mutated container requires more resources than initially allocated.

Figure 2:
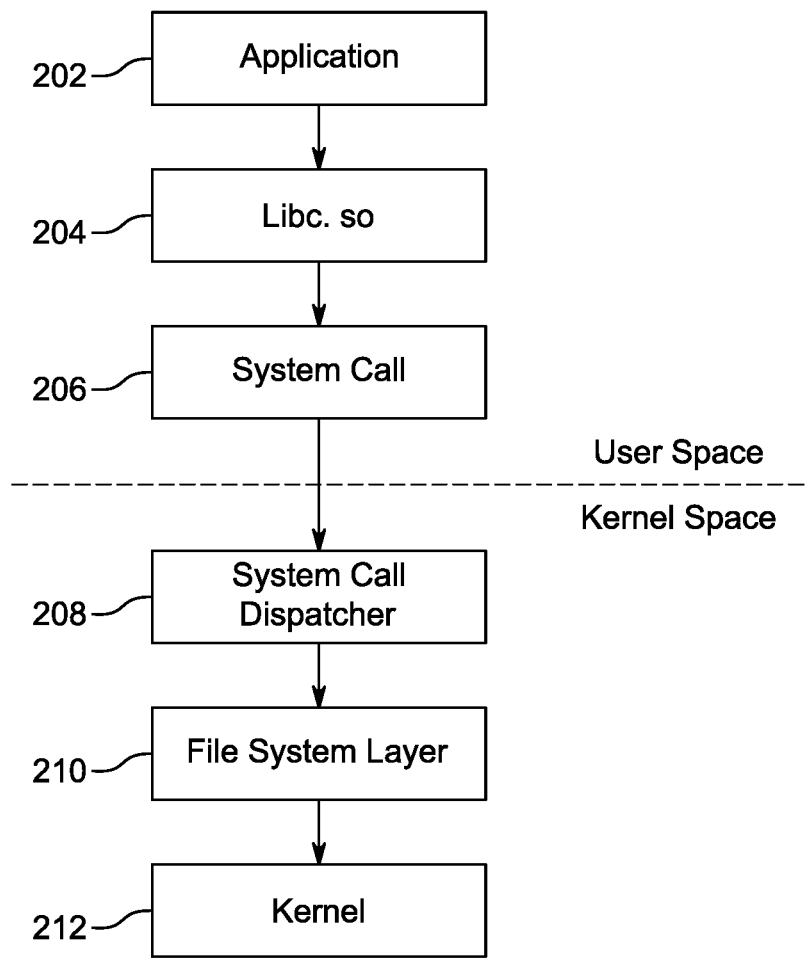
FIG. 2 shows a conventional flow of API calls originating from an application in a generic software stack.

FIG. 2 shows a conventional flow of API calls originating from an application in a generic software stack. System memory in UNIX-like operating systems may be divided into two distinct regions, namely kernel space and user space. FIG. 2 shows the user space and the kernel space demarcated by the dashed line. Kernel space is where the kernel executes and provides its services. User space is where a user process (i.e., all processes other than the kernel) executes, a process being an instance of an executing program. The kernel manages individual user processes within the user space and prevents them from interfering with each other. A user process typically cannot access kernel space or another user process's user space. However, an active user process may access kernel space by invoking a system call.

Starting with block 202, an application can make an application programming interface (API) call (e.g., open, write, read, etc.). That call is passed to block 204 where a library (e.g., Libc.so) is accessed to execute the API call. The library can contain subroutines for performing system calls or other functions. At block 206, a system call is invoked. The system call may be a modification of an existing system call generally available from the operating system. For example, the system call may be a modified version of the ioctl system call. The system call may be invoked by filling up register values then asserting a software interrupt that allows trapping into kernel space. For example, block 206 may be performed by a C language program that runs in the Linux operating system. The C language program may move the system call's number into the register of a processor and then assert an interrupt. The invocation of the system call can be made using a programming language's library system call interface. In one embodiment, the invocation of the system call is made using the C programming language's library system call interface.

In block 208, the invocation of the system call executes a trap to enter the kernel space. The system call dispatcher gets the system call number to identify the system call that needs to be invoked.

In block 210, the system call dispatcher vectors branches to the system call, which in the example of FIG. 2 involves a file operation. Accordingly, the system call is executed through the operating system's file system layer. The file system layer may be the Virtual File System (VFS) layer of the Linux operating system, for example. During blocks 208 and 210, the kernel stack gets populated with information that allows the processor to execute the instructions relating to the system call. Such information may include the return address of the system call and the system call table address. In block 212, the system call invoked in block 206 is executed in the kernel.

The TIAP is purpose-built to automatically observe cloud native applications, employing a language-agnostic library that can be deployed to any Kubernetes cluster with a single command –no sidecars, agents, or kernel modules required. By correlating static container scans with runtime analysis, the TIAP enables developers to resolve issues faster with rich remediation guidance.

Figure 3:
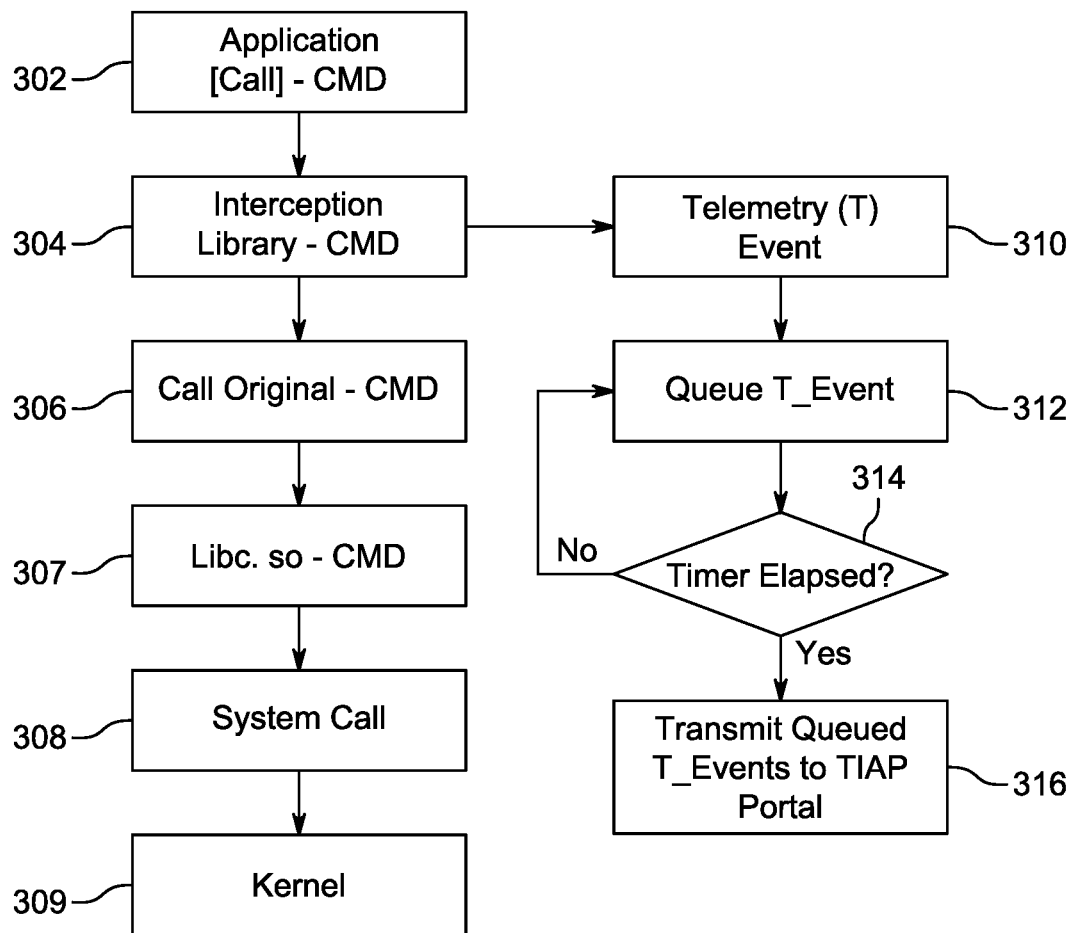
FIG. 3 shows a flow diagram for intercepting calls at the API/library level according to an embodiment.

The TIAP according to embodiments discussed herein can intercept operations originating from the application at the library level of the software stack. This is in contrast with conventional hook operations that intercept at the system call level or somewhere within the kernel space, typically accessed using Extended Berkeley Packet Filter (eBPF). Hooks using eBPF are often subject to various issues such as software updates to parts of the software stack that require special permissions, administrator permissions, or lack of API assurance that can result in breaking the application. Therefore, to eliminate such issues, embodiments discussed herein intercept at the library level. Referring now to FIG. 3, a flow diagram for intercepting calls at the API/library level according to embodiments discussed herein is shown. Starting at block 302, an application makes an API call to execute a particular command (shown as CMD). The command is passed to an interception library at block 304. The interception library is interposed between the application call and the native library associated with the application (block 308).

The application is programmed via an instrumentation or system loading process (e.g., performed by instrumentation module 116) to interact with the interception library first before calling the original command with the native application.

The interception library can include the same functions of the native library or subset thereof and any proprietary APIs, but is associated with analysis platform and enables extraction of telemetry events related to operation of the application. When a function is called in the interception library, the telemetry event collection is performed and actual code in the native library is accessed to implement the function call. Telemetry events are shown in block 310. The interception library can enable all parameters of the API call to be recorded in a telemetry event. For example, if the API call is an OPEN command, the parameters can include file path, permissions, identification information, environmental information, etc. Since applications are continually monitored using embodiments discussed herein, telemetry events are constantly being collected and provided to the TIAP portal (e.g., portal 160). For example, the telemetry events may be queued at block 312 and batch transmitted to the analysis platform (block 316) each time a timer elapses at decision block 314. The TIAP portal can be run locally on the same device that is running the application or the analysis platform can be run remotely from the device running the application. In the remote case, the telemetry events may be transmitted via a network connection (e.g., the Internet) to the TIAP portal.

Telemetry events collected by the TIAP runtime can be buffered in memory into a lock-free queue. This requires little overhead during loaded program execution as the telemetry upload occurs less frequently. The size of the event queue is determined by a setting periodically refreshed by the TIAP portal. The customer is permitted to set the amount of memory and CPU overhead that the TIAP runtime can consume. The TAP runtime can adjust the size of the event queue and the quality of data measured accordingly. In the case that events need to be dropped due to exceeding the allowed CPU/memory thresholds, a simple counter can be maintained to reflect the number of dropped events. When there is adequate resource available, the number of missed events is communicated to the TIAP platform. The buffer can be flushed periodically, depending on size and overhead constraints. This is done at event submission time (e.g., any event can potentially trigger a buffer flush). During flush, the events in the queue are batched and sent to an event service in the TIAP portal using REST or gRPC. The TIAP runtime can also support a high-priority queue, for urgent events/alerts.

The TIAP runtime may be required to handle special cases. The special cases can include handling signals, handling dynamic library loads, and handling fork and exec functions. Signal handling is now discussed. Telemetry events occurring during signal handling have to be queued in a way that uses no signal-unsafe APIs; this is the exception to the rule that that any event can cause a buffer flush. All trappable signals are caught by the runtime. The runtime increments counts of received signals for periodic upload to the management portal. In order to support the component's own use of signals, the runtime retains a list of any handlers the component registers using sigaction and invokes those handlers upon receiving a signal. This may require removing a stack frame before calling the handler.

The runtime intercepts calls to the dlsym, dlopen, and other dynamic library load routines. These loaded libraries are subject to the same telemetry grammar treatment as during initial load. Calls to these functions also may result in telemetry events of their own.

The fork and exec functions require special treatment. Fork can result in an exact copy of the process being created, including a TIAP runtime state. In order to support fork properly, the fork call is intercepted and the following sequence of operations is performed: a fork telemetry event is sent (if such a telemetry grammar exists), the child's event queues are cleared, and the child's instance ID is regenerated. This sequence of steps ensures that the TIAP portal sees a clean set of telemetries from the child. The exec function requires other special treatment. On exec, the following sequence of operations is performed: the original arguments to exec are preserved, the arguments to exec are changed to point to the current program (e.g., the program that is already loaded), with no command line arguments and an environment variable named DF_EXEC set to the original arguments supplied by the caller. As a result, the operating system re-executes the same program, causing the runtime to restart itself. Upon seeing DF_EXEC set, the runtime will launch the original program defined in the call to exec, with runtime protection.

Immediately after the application call is sent to block 304, the original call command is invoked at block 306. Calling the original command is necessary to allow the application to operate as intended. The operations in blocks 304, 306, 310, 312, 314, and 316 may be executed by TIAP runtime module 110 or telemetry module 112. The original call command accesses the native library at block 307. This leads to a system call at block 308, and then access to the kernel at block 309.

It should be understood the flowchart can be implemented in any process being used by a customer application product. For example, the flowchart can be implemented in a web server, a database, middleware, or any other suitable platform being used by the application. That is, the same interception library can be used in all processes. This enables a history of the stack trace to be captured and analyzed.

Figure 4:
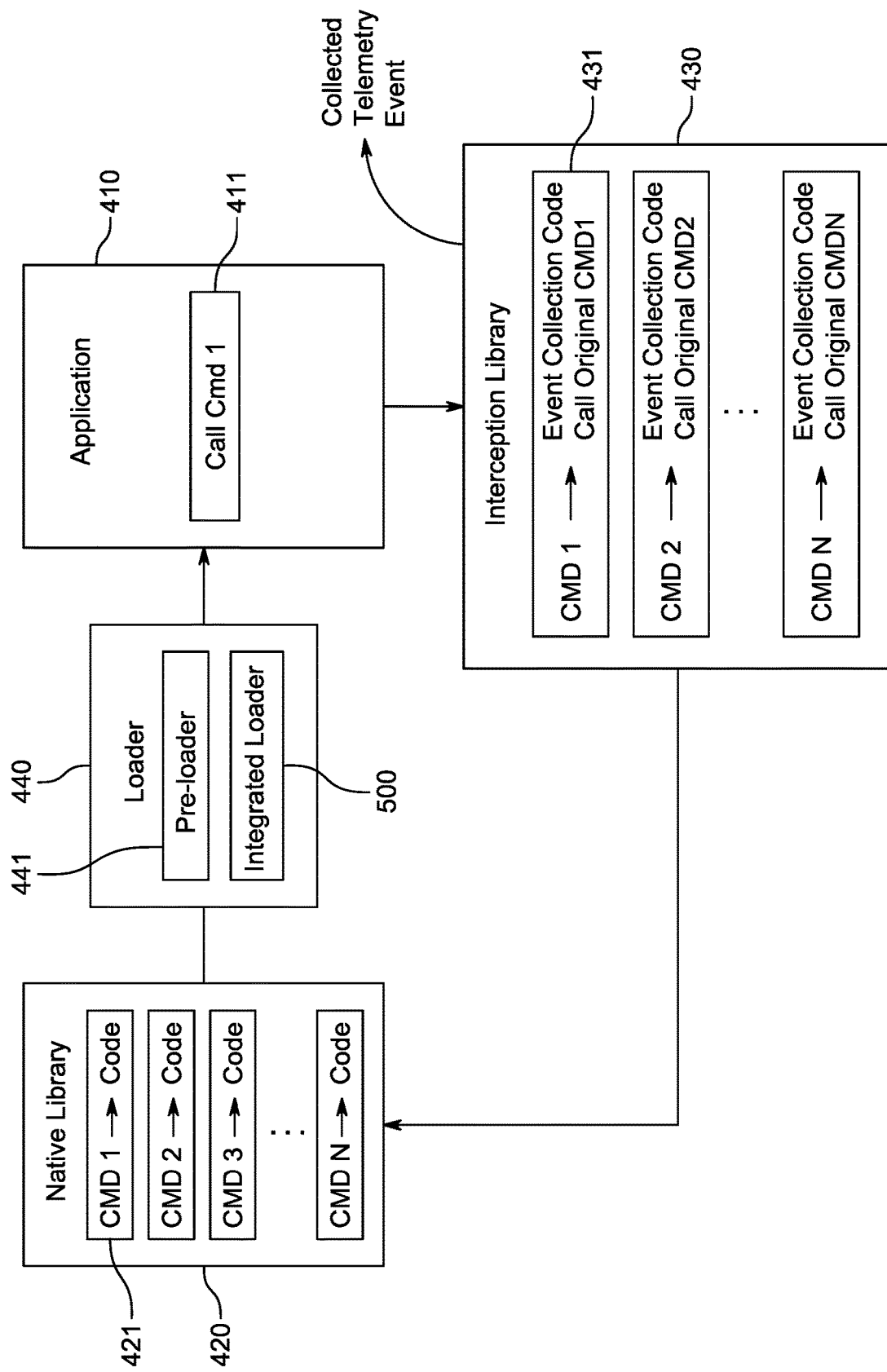
FIG. 4 shows an illustrative block diagram of how the application calls are intercepted, how event telemetry is collected, and how the application calls are executed according to an embodiment.

FIG. 4 shows an illustrative block diagram of how the application calls are intercepted, how event telemetry is collected, and how the application calls are executed according to an embodiment. The application is shown in block 410 and the native library associated with the application is shown in block 420. Native library 420 can include code for N number of commands, functions, or binaries (shown here as CMD1, CMD2, CMD3, and so on). Each command is associated with its own code (as shown) for implementing the command. When application 410 is running, it can call a command (e.g., call CMD1 411). FIG. 4 also shows an interception library in block 430. Interception library 430 can include a copy of each command contained in the native library. The copied commands may not contain the actual code of the native library commands but can include event collection code (or interception code) that enables telemetry associated with the application call to be collected. After the telemetry event is collected, the original command called by the application is called using a trampoline function. The interception code can include the trampoline function and telemetry grammars that define what parameters to collect. For example, assume application 410 calls CMD1 411. In response to call of CMD1 411, CMD1 431 in interception library 430 is accessed, and the telemetry event associated with call CMD1 411 is collected. After the event is collected, the original CMD1 421 is called using a trampoline function and the application call of CMD 411 is executed. In a trampoline function, call CMD1 411 initially goes to interception library 430 and then trampolines to native library 420.

Loader 440 can enable application 410 to load code in a library to be executed. For example, assuming that interception library is not present and the call CMD1 411 is called. The loader would load the code 421 in native library called so that the CMD1 operation could be executed. However, in the embodiment illustrated in FIG. 4, interception library 430 is present and must be the first library accessed in response to a call by application 410. One way to ensure that interception library is accessed first is to set a pre-loader (e.g., preloader 441) to interception library 430. The preloader is commonly referred to as LD_PRELAOD. For example, LD_PRELOAD is set to Interception Library. This results in pre-loader instructing loader 440 to access interception library 430 first before accessing any other libraries such as native library 410.

An alternative to using a preloader is to use an integrated loader (e.g., integrated loader 500) for each application. This integrated loader can eliminate a few potential issues that may exist with using the preloader. For example, a customer could turn the preloader off, which would prevent telemetry collection because the interception library would not be accessed first. Another potential issue that can arise using the preloader is that other resources may use it, thereby potentially causing who goes first management issues. In addition, if an application uses static linking (e.g., where code in the native library is copied over to the application), the pre-loader will not work.

Figure 5:
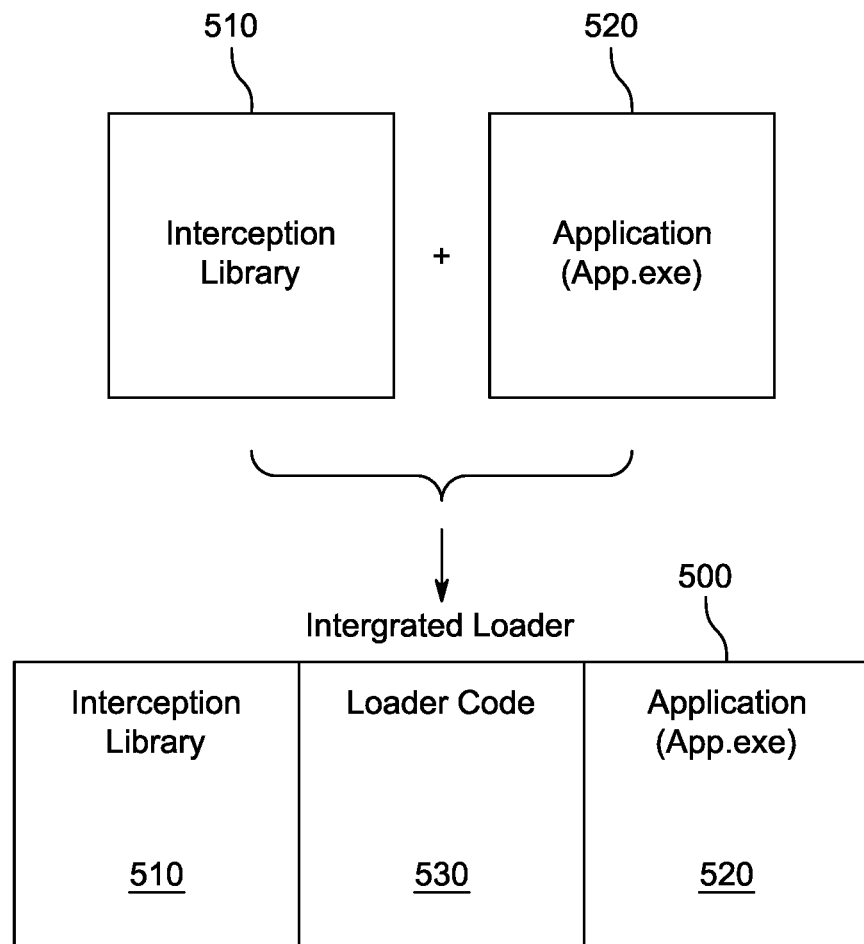
FIG. 5 shows an illustrative block diagram of an integrated loader according to an embodiment.

FIG. 5 shows an illustrative block diagram of an integrated loader according to an embodiment. Integrated loader 500 can be a combination of an interception library 510, an application 520, and loader code 530. When integrated loader is run, interception library 510 is first accessed, and then loader 530 is accessed to load application 520 without requiring any external dependencies. When integrated loader 500 is used, the same flow as described above in connection with FIG. 4 is used. That is, when the application makes a call, that call is intercepted by the interception library (and event telemetry is collected) and the original call is executed. Integrated loader 500 can be a custom built loader that does in-place trampolining based on IAT (import address table)/GOT (Global Object Table)/PLT (Procedure Linking Table) fixups. In some embodiments where static binaries are used, integrated loader 500 can execute hunt-and-replace fixups for static binaries as opposed to using load-time fixups.

Figure 6:
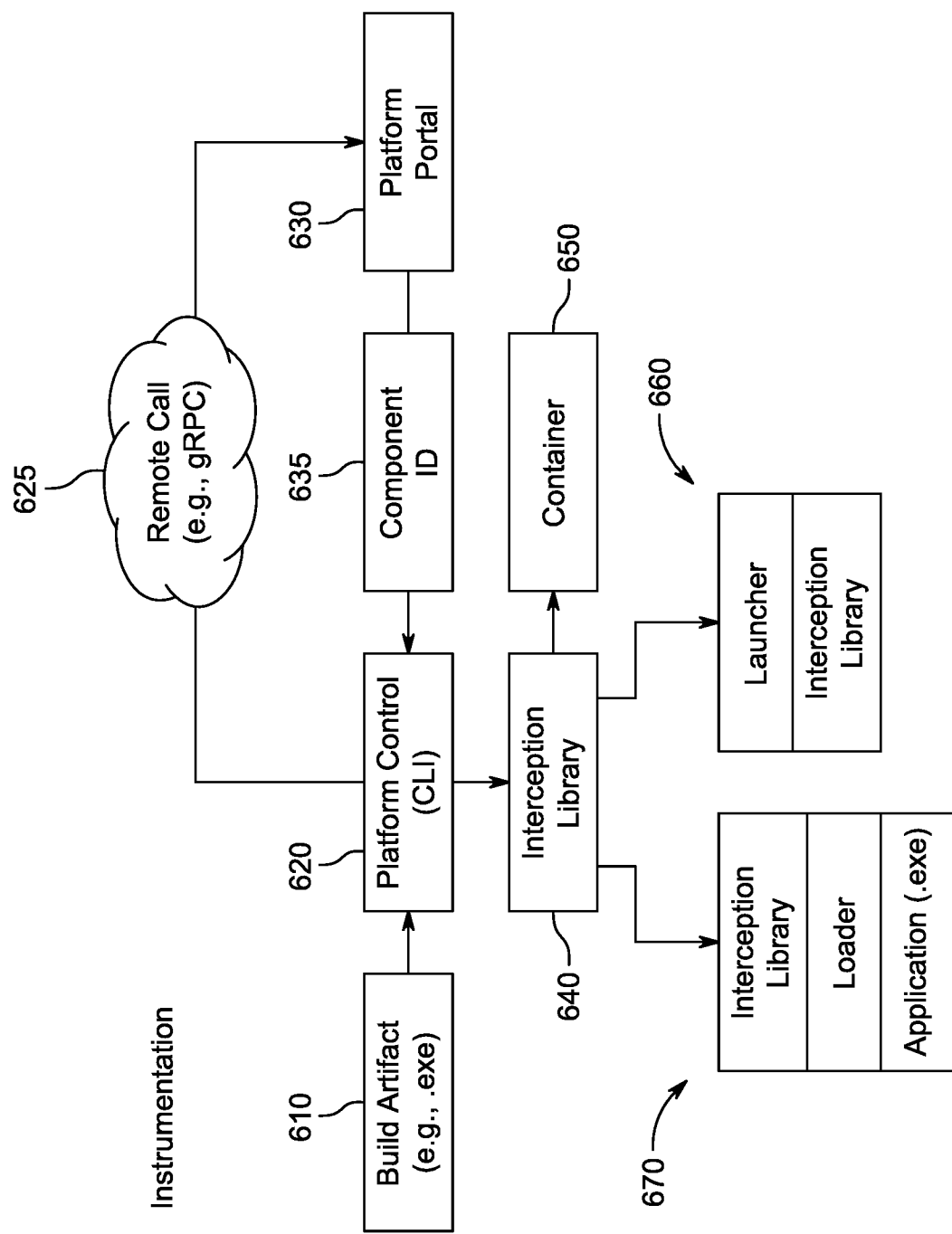
FIG. 6 shows an illustrative block diagram of an instrumentation module or system loading module according to an embodiment.

FIG. 6 shows an illustrative block diagram of an instrumentation module or system loading module according to an embodiment. A process called system loading or instrumentation is performed to merge a customer application (i.e., application executable) with the TIAP to produce a new "system loaded" build output. The result is executable code unique to the customer. System loading combines the TIAP runtime (e.g., interception library), the customer build artifact (i.e., customer application), an optional loader, and an optional security policy, and outputs a new binary that is a drop-in replacement for the original customer build output. The replacement executable code is used to provide telemetry collection and optionally, policy enforcement. Customers may also optionally load parts of their application that are not self-built (e.g., system loading a database engine or web server binary is possible). FIG. 6 shows build artifact (e.g., a component binary or the application executable) in block 610, a command line interface in block 620, remote call in block 625, the TIAP portal in block 630, component ID in block 635, interception library in block 640, a container in block 650, a launcher in block 660, and integrated loader in block 670.

The system loader is a program that is built on the TIAP and downloaded by a user to their workstation or build infrastructure machine. The system loader is typically part of a command line interface tool. In some embodiments, command line interface (CLI) tool 620 can be custom built for each customer as it will load components for that customer only. In other embodiments, CLI tool 620 is generic tool provided to each customer that enables the customer to build a different interception library for each application. The TIAP 630 can create the custom CLI tool (containing the system loading function) by using a link kit installed in the portal. The link kit includes a set of object files (.o files) that are linked against a customer-specific object file built on demand (from a dynamic code generation backend placing various statements into a .c file and compiling to an object file). This produces a customer specific CLI tool that contains all information required to produce a binary keyed to the customer that downloaded the CLI tool. This per-customer approach to CLI tool generation eliminates the need for the customer/user to enter many tenant-specific details when loading components. The CLI tool may also contain any SSL certificates or other items required for a secure transaction with the management portal. In other approaches, the SSL certificates can be obtained from an "API token," which substitutes embedding the SSL certificate into CLI tool 620. The CLI tool can provide several functions: loading, showing/managing applications and components, showing telemetry events, showing audit logs, and showing alerts and metrics At a high level, the CLI tool offers a command line interface to much of the same functionality offered by the web UI provided by the TIAP portal.

During system loading, CLI 620 can receive build artifact 610 and generate interception library 640 by developing interception code for each component in the build artifact 610. The interception code can include telemetry grammars that define which events should be monitored for and recorded. The interception code can also include a trampoline function that transfers the application call to the native library so that the original call by the application is executed as intended. That is for each component of an application, application executable, or build artifact, a TIAP based interception code is generated and included in interception library 640. For example, if first command code is being processed, CLI 620 can send that first command to platform portal 630 via remote call 625. Portal 630 can assign that command a component ID 635 and pass it back down to CLI 620. This way when telemetry events are collected, the component ID will match with the component ID assigned by portal 630. CLI 620 can populate interception library 640 with each component of build artifact 610. When the interception library is complete, CLI 620 can provide the output to container 650, launcher 660, or integrated loader 670. Container 650 can be a class, a data structure, or an abstract data type whose instances are collections of other objects. Launcher 660 is akin to the preloader concept discussed above in connection with FIG. 4. Loader 670 is akin the integrated loader concept discussed above in connection with FIG. 5.

Protection of non-executable artifacts is also possible. To protect interpreted scripts or languages, the system loader can provide a special launcher mode that produces a special binary containing only the TIAP runtime. When using launcher mode, the special binary executes a command of the customer's choice, as if the command being executed was already contained within the output. This allows for scenarios where interpreted languages are used and it is not determinable which interpreter may be present in the target (deployment) machine (as such interpreters may vary between the build environment and the deployment environment).

The CLI tool has various subcommands that are specified on the command line, such as 'load', 'applications', 'components', etc. The load subcommand can run in one of two modes: default and launcher. Each mode produces a different type of output file. In the default mode, which produces an integrated launcher of FIG. 5, the tool takes an input file (a binary file typically produced by the customer's build system or sourced from a trusted ISV), and produces an output file containing TIAP runtime code, customer application executable code (e.g., customer binary), certificates, digital signatures, and telemetry grammar. The CLI tool can contain TIAP runtime code for many different architectures (e.g., amd64, i386, arm32, aarch64, etc.). The specific runtime to choose is determined by the architecture of the customer binary. Certificates can include other identity material for later use in secure communication with the TIAP during execution. The digital signature may be used to avoid tampering (on platforms which support this feature). The Component ID is assigned by the TIAP during the system loading operation and is part of the loaded output. As stated previously, the TIAP runtime is capable of collecting arbitrary telemetry events. The TIAP runtime inserts trampolines into a component based on a set of telemetry grammars that describe which APIs/functions to interpose on. A telemetry grammar can include a code module name (which is name of a native library or other executable code that the API of interest is associated), a function name (which is the name of the function to intercept), and parameter grammars (which can include none or one or more of the following: parameter number (which can include the ordinal position of the parameter (C calling convention ("left-to-right"))), parameter type (which is the data type of this parameter), and parameter size, which is the size of the data, if not known from its type)).

A list of telemetry grammars is built into the loaded component. This occurs at application registration time (e.g., during system loading, when the component and application are being registered with the TIAP). The TIAP can provide a preconfigured set of interesting/well-known telemetry grammars that are automatically available as part of this transaction. Customers can override, customize, or remove any of these grammars using a user interface in a TIAP management portal (or the CLI tool). Customers can also define their own telemetry grammars, if they wish to collect additional telemetries not present in the TIAP common set.

The default set of telemetry grammars is stored in the TIAP's configuration database, and cloned/copied for each customer as they register with TIAP; this allows the customer to make any customizations to the default set they wish, if desired. Each set of customer-specific telemetry grammars are stored with the customer data in the configuration database (albeit separate from the default set or other customers' sets).

In launcher mode, the input is not specified using the −i argument, but rather with a −I (capital I). Launcher mode may be akin to the pre-loader of FIG. 4. This flag indicates that the subsequent command line parameter (after the −I) is to be interpreted as a command line that the runtime will launch. In launcher mode, the customer binary is not embedded with the output. Rather, the system loading process outputs the TIAP runtime code, the component ID, certificates, digital signature, command line, and telemetry grammar. The specific runtime to choose is determined by the -a command line flag. In launcher mode, the TIAP will execute the command specified, and attach itself to the launched process subsequently. Launcher mode is intended for use in scenarios where the customer is reluctant to bundle the runtime code with a 3rd party interpreter (Java, Python, etc).

If the system loader is being run in default mode and a non-executable file is specified as an input, the system loader will abort and recommend launcher mode instead. If the system loader registers a component that already exists in the TIAP, the system loader will abort and inform the user of this.

During component registration, a set of telemetry grammars will be sent to the system loader from the TIAP. These telemetry grammars contain a list of the libraries and APIs that should be intercepted for this component.

Both system loading modes accept a -t argument that contains a freeform string to be interpreted by the platform as the build time tag. This will typically be a comma separated set of key value pairs that the customer can use to assign any metadata to this component. Note that build time tags are included in the determination of any duplicate components.

The TIAP runtime is executable code that runs at process launch. It is built as position-independent code (PIC) and/or position-independent executable (PIE), and self-relocates to a random virtual address immediately upon startup. The runtime first performs a self-integrity check (to the extent possible considering the platform in use), and then performs a one-time survey/data collection of the following information: platform query, kernel version, memory, CPU (number, type, and speed), NUMA information, distribution information, and network/hardware information. The runtime then performs a transaction with the TIAP portal, sending the aforementioned data as part of a "component start" event. The TIAP portal may reply to this event by (1) proceed with start or (2) do not start. Additionally, the TIAP portal can inform the component that the host software catalogue is out of date by returning such a status code along with the component start event reply.

A host software catalogue is a list of software packages and constituent files on the machine running the component, indexed by hostname and IP address. This information is periodically gathered and uploaded to the TIAP portal to assist with analytics (specifically a common vulnerabilities and exposures (CVE) service). This catalogue is periodically updated, and the TIAP portal will report back out of date if the catalogue does not exist at all, or if the component loading date is later than the last catalogue update time, or if a set age threshold is exceeded (typically set to 1 week by default). If the TIAP portal requests a new catalogue to be uploaded, the runtime will compile the catalogue in a background thread and upload it to the portal when complete (asynchronously, low priority thread). The runtime either then starts the loaded or launched program, or, if the environment DF_EXEC is set, the value of that environment variable's content is used as the launched command line, overriding any -l (launch command) arguments.

On startup, the TIAP runtime can act as a replacement for the system run-time link-editor. The run-time link-editor ("loader") resolves symbols from required libraries and creates the appropriate linkages. The TIAP runtime can redirect any function names specified in the trampoline grammar to itself, resulting in the creation of a trampoline. A trampoline function takes temporary control over program code flow performs the desired telemetry collection, calls the original function, and then queues an event to the event queue (if the grammar specifies that the API return value or function timing information is to be collected—otherwise the event is sent before the original function is called).

Static binaries pose a different challenge in the sense that there are typically no imports listed in the executable header. The runtime must perform a "hunt and patch" operation, in an attempt to find the corresponding system call stubs that match the function listed in the telemetry grammar. This can involve the following extra steps: searching through memory regions marked executable for system call (syscall) instructions, handling polymorphic syscall instructions (syscall opcodes buried within other instructions; false positives), handling just in time compiled (JITed) code, and handling self-modifying code. JITed and self-modifying code can be detected by mprotect(2) calls—code behaving in this way will be attempting to set the +X bit on such regions. Certain well known languages that output code using these approaches can be handled by out-of-band knowledge (such as hand inspection or clues/quirks databases).

After a customer's product has been configured to operate with the TIAP, telemetry events can be collected. These events can be communicated to the TIAP using an event API. Each "instrumented" component of the customer's application may be able to access the event API to communicate events. The communicated events may be processed by an event service running on the TIAP. The event service can be implemented as a gRPC endpoint running on a server responsible for the component. When the TIAP runtime detects an event of interest, a gRPC method invocation is invoked on the event service. The TIAP runtime knows the server (and consequently, event service) it will communicate with as this information is hardcoded into the runtime during initial loading of that component. Certain common events may occur often (e.g., opening the same file multiple times). In this case, the component may submit a "duplicate event" message which refers to a previous event instead of a completely new event message. This reduces traffic to the server.

The telemetry grammars runtime can define a telemetry level for each component or component instance. The telemetry levels can be set one of many different levels (e.g., four different levels). Telemetry levels govern the quantity of events and data sent from the instance to the event service in the TIAP portal. Several different telemetry levels are now discussed. One telemetry level may be a zero or none level that enables the runtime to perform as a passthrough and sends only component start and exit events. Another level may be a minimal level in which the runtime sends only component start events, component exit events, metadata events, and minimal telemetry events. In this level, the runtime only communicates basic information such as the number of file or network operations/etc. Yet another level may be a standard level in which the runtime sends every type of event defined for the minimal level, plus events containing telemetry about the names of files being opened and lists of 5-tuple network connection information. In this level, file events will contain only a file name plus a count indicating the number of times that file was opened. Similarly, this level conveys the list of 5-tuples and a count of how many times that 5-tuple was seen. The standard level also sends event telemetry for the count of each 3rd party API used (count and type). Yet another level is the full level in which the runtime sends all events, including a separate event for each file and network access containing more information about the access, a separate event for each API access, etc. The full telemetry model may buffer events in the instance's filesystem locally before uploading many events in bulk (to conserve network bandwidth).

The telemetry levels can be configured in a variety of different ways. A default telemetry level can be set when the application or component is loaded. If desired any default telemetry level can be overridden at runtime by a runtime tag. The telemetry level can be set by an administrator using the TIAP portal. The administrator can override either of the above settings using a per-instance/component group/application/dashboard setting for the desired telemetry level. Telemetry levels are communicated back to the component multiplexed with the return status code for any event.

The telemetry events can be configured to adhere to a specific message structure. The message structure may be required to interface with the protocol buffers or Interface Definition Language (IDL) used by the event service. Each event can include two parts: an event envelope and an event body. The event envelope can include a header that contains information about the classification/type of the event, and information about the runtime that generated the event. The event body can include a structure containing the event information. This structure is uniquely formatted for each different type of event.

The event envelope can include several different fields. Seven fields are shown in the example pseudocode above. One field is the component_id field. This field includes the universally unique identifier (UUID) of the component making the event submission. This ID is created during system loader and remains constant for the lifetime of the component. Note that there can be multiple component instances with the same component ID. Another field is the event_id field. This is the UUID of the event being submitted. This ID is selected randomly at event creation time. Event IDs can be reused by setting a 'duplicate' flag. Another field is the uint64 timestamp field which represents of the number of seconds since the start of a component instance (e.g., standard UNIX time_t format) when the event occurred. Yet another field is the timestamp_us—uint64_t which is a representation of the number of microseconds in the current second since the start of the component instance (e.g., standard UNIX time_t format) when the event occurred. Another field is the duplicate field which is set to true to indicate this event is a duplicate of a previously submitted event, and varies only in timestamp. A build_tag field contains the build time tag assigned to the component submitting the event, if any. A runtime_tag field contains the runtime (environment variable sourced) tag assigned to the component instance submitting the event, if any.

If the duplicate field is set to 1, this indicates that the event with the supplied event_id has occurred again. In this scenario, the event service will ignore any other submitted values in the rest of the message, except for the updated/new timestamp values.

Many different types of telemetry events can be collected. Each of these event types can be processed by the event service running on the TIAP. Several event types are now discussed. One event type is a component start event, which is sent when the component starts. This event includes information about the component, runtime, host platform and library versions, and other environmental data. Component start events are sent after the runtime has completed its consistency checks and surveyed the host machine for infrastructure-related information.

The IDL shown above describes two enumerations used in this event type: architecture_type and OS. Architecture type is enumerated by a value indicating the platform of the runtime making the event submission. The OS is enumerated by a value indicating the operating system of the runtime making the event submission. The version and os_type fields are freeform strings. For example, on a Windows host, version might be set to "Windows Server 2019". On a Linux host, version might be set to "5.2" (indicating the kernel version). The os_type on a Linux host might be sourced from the content of lsb_release and might contain "Ubuntu 18.04", for example. The runtime will calculate the amount of time spent during component startup and report this in the start_time and start_time_us fields. This time represents the overhead induced by the platform during launch.

Another type of event is a component exit event. A component exit event is sent when the component exits (terminates). Component exit events are sent if the component calls exit(3) or abort(3), and may also be sent during other abnormal exit conditions (if these conditions are visible to the runtime). Component exit events have no event parameters or data other than the event envelope.

Another event type is a file event. A file event is sent when various file operations (e.g., open/close/read/write) occur. These are sent for individual operations, when the runtime is in maximum telemetry collection mode. No events are sent on other file operations. File open operations are used to discern component file I/O intent—based on the O_xxx flags to open(2), events may or may not be sent. Exec operations, while not specifically based on open(2), can be sent for components that call exec(3) using a process event.y.

Yet another event type is a bulk file event. A bulk file event can be sent periodically when the runtime is in minimal telemetry collection mode or higher. It can contains a list of files opened plus the count of each open (e.g., "opened/etc/passwd 10 times"). Multiple files can be contained in a bulk file event.

Network events are yet another event type. Network events can be sent when various network operations (e.g., listen/accept/bind) occur. These are sent for individual operations, when the runtime is in maximum telemetry collection mode. Network events can be sent under the following conditions: inbound connections and outbound connections. An inbound connection event can be sent when the component issues a system call (e.g., the bind(2) system call). Outbound Connections—An outbound connection event can be sent when the component issues a connect system call (e.g., connect(2) system call).

The runtime will fill a NetworkEventBody message with the fields defined above. Protocol numbers are taken from a socket system call (e.g., socket(2) system call) and defined in various protocols. The TIAP portal or command line interface is responsible for converting the protocol numbers to readable strings. Address family information is also taken from a system call (e.g., system(2) call) and correspond to AF_* values from socket.h. The local_address and remote_address fields contain up to 16 bytes of local and remote address information (to accommodate large address types such as IPv6). If shorter address sizes are used, the unused bytes are undefined. It should be noted that all fields are populated on a best-effort basis. In certain circumstances, it is not possible for the runtime to detect some of the parameters required. In this case, the runtime will not supply any value for that field (and the field will default to protobuf's default value for that field type).

Bulk network events are yet another type of telemetry events. Bulk network events can be sent periodically when the runtime is in minimal telemetry collection mode or higher. These events can contain a list of 5-tuple network connection events (e.g., connect from local 1.2.3.4:50 TCP to 4.5.6.7:80). Multiple 5-tuple network connection events can be contained in a bulk network event.

Network change events are another example of telemetry events. Network change evens can be sent when an IP address on the machine changes. This event is also sent by the runtime during component start to let the management portal know which IP addresses the system is currently using. Network change events are sent by the runtime when an network change has been detected on the host. This is a periodic/best-effort message and these events may not be delivered immediately upon network state change. Network changes can include addition or removal of an interface, addition or removal of an IP address to an existing interface, or an alteration of a network's media type. A network change event summarizes the current state of all interfaces on the host. This simplifies the logic required by the API and analytics service as only the latest network change event needs to be examined in order to determine the current state, with the slight drawback of having to re-send information for unchanged interfaces.

Memory events are another example of telemetry events. Memory events can be sent when various memory operations (e.g., mprotect/mmap with unsafe permissions) occur. Memory events can be sent when a component attempts to assign an invalid permission to a region of memory. For example, the event may be sent when attempting to set writable and executable memory simultaneously or attempting to set writable permission on code pages. Memory events are not sent for 'normal' memory operations like malloc(2) or free(2). This is due to the volume of ordinary memory events that occur with great frequency during normal component operation.

Depending on the type of memory event, the runtime may or may not be able to compute values for all the fields described above. In this case, the default protobuf values for those data types can be used.

Process events are another example of telemetry type. Process events can be sent when process related operations such as fork/exec or library loads occur. The runtime sends a process event when any of the following occur: the process forks using a fork call (e.g., fork(2)), the process executes using any of the exec*(2) or posix_spawn(2) system calls, or the process loads a new library using a open system call (e.g., dlopen(2)). A process event contains an identifier corresponding to the type of event that occurred, with additional information for execute and library load events.

The info field contains value data if event_type is ExecEvent or LibraryEvent. It is undefined for ForkEvent style process events. The info field contains the name of the executed process plus command line parameters for ExecEvent events, and the fully qualified pathname for LibraryEvent events.

Metadata events are another example of a telemetry type. Metadata events can be sent at periodic intervals to update the management portal with information about memory and CPU usage. Metadata events are periodic events sent from the runtime that contain metrics that are counted by the runtime but that might not necessarily result in alerts being generated. Generally, metadata events are events that contain data that do not fit into other event categories. These metrics can include current process memory usage, current OS-reported CPU usage, number of signals received by the process, TIPA runtime overhead (CPU/memory), and total number of events sent to the event service.

It should be understood that the foregoing IDL definitions are not exhaustive and that other event IDL definitions are possible based on telemetry gathered using embodiments discussed herein.

Third party API usage events are another telemetry type and can be sent when the component makes use of a monitored third party API (e.g., typically CSP-provided APIs, like S3, RDS, etc).

Figure 7:
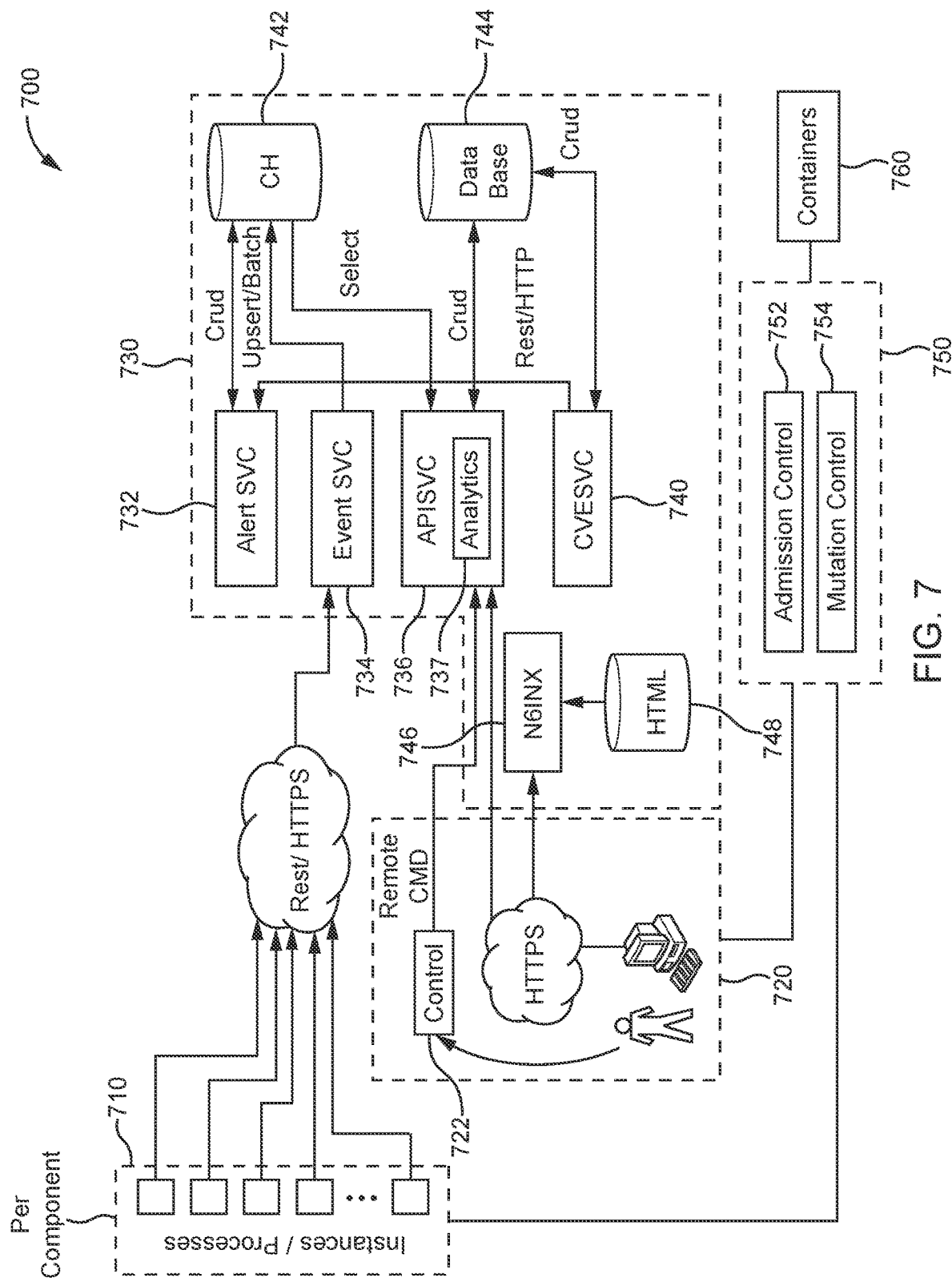
FIG. 7 shows an illustrative block diagram of a portal according to an embodiment.

FIG. 7 shows an illustrative block diagram of TIAP 700 according to an embodiment. In particular, FIG. 7 shows instances of one or more components 710 associated with a customer application being run and sending telemetry events, a user interface 720 for interfacing with the TIAP, and backend portion of the TIAP portal 730. The dashed line box 710 can represent one component associated with an application that has a component configured to communicate telemetry events to TIAP portal 730. Each box within dashed line box may represent specific instances or processes for that component. It should be understood that multiple components are typically associated with an application, but only one is shown to avoid overcrowding the drawing. User interface 720 can include, for example, a website based user interface that enables an administrator to access TIAP portal 730. The content of the UI can be delivered by an engine X (nginx) web server (preconfigured in the appliance image if hosted on-premise). The user can interact with a control UI 722 to send remote commands to API service 732 in TIAP portal 730. Example screen shots of different UI screens are discussed in more detail below. TIAP portal 730 can operate several different services, a click house, a postgres (PG), and HTML code. In particular, TIAP portal 730 can include alert service 732, event service 734, API service 736, webapp service 738, CVE service 740, clickhouse 742, databases 744, servicer software 746, and HTML database 748. CRUD represents basic functions of persistent storage, including create, read, update, and delete. REST refers to a representational state transfer that defines a set of constraints.

TIAP 700 can be implemented as a multitenant SaaS service. This service contains all the TIAP platform software components. It is anticipated that some customers may desire to host parts or all of the SaaS portal in their own datacentre. To that end, a single-tenant version of the TIAP portal services can be made available as appliance virtual machine images. For example, the appliance image can be an .OVF file for deployment on a local hypervisor (for example, VMware vSphere, Microsoft Hyper-V, or equivalent), or as an Amazon Web Service Amazon Machine Image (AMI). The appliance images are periodically updated and each deployed appliance can optionally be configured to periodically check for updated appliance code.

API service 736 can implement a core set of APIs used by consumers of TIAP 700. For example, API service may enable user interface 722, a command line application tool, or any customer-written applications that interface with TIAP 700. In some embodiments, API service 736 may function as an API server. API service 736 can be in Node.js using a Sail JS MVC framework. Services provided by API service 736 can be implemented as REST APIs and manage many different types of entities stored in an event database (e.g., clickhouse 742). One such entity can include applications, where service 736 retrieves application information from a primary DB (database 744) based on various parameters (application name, for example). Another entity can be components in which server 736 retrieves component group information from the primary DB (database 744) based on various parameters (component ID, for example). Yet another entity can include instances in which service 736 retrieves instance information from the primary DB (database 744) based on various parameters (component ID and hostname, for example). Another entity can include events in which service 736 retrieves event information from the Events DB (ClickHouse 742) based on various parameters (component or application ID plus event type, for example).

API service 736 can also provide REST APIs to manage alert and insight entities stored in an analytics database (not shown). An alert entity API can retrieve alerts that have been deposited by analytics service 737 into an analytics database (not shown). An insight API can retrieve insights (analysis items) that have been generated by analytics service 737.

API service 736 can also provide REST APIs to manage the entities stored in a CVE database. A CVE API can produce a list of CVEs of components that are vulnerable.

API service 736 can provide provides REST APIs to manage the entities stored in a user database. A users API can provide user accounts, including saved thresholds and filters, and other UI settings. A role API can provide group roles, including role permissions.

REST calls to API service 736 can require an API key. API keys are JWTs (JSON Web Tokens) that grant access to the bearer for a particular amount of time. JWTs generated by the API keys are assigned by the authentication service during logon (for the browser/UI based application) and can also be manually created for use with the CLI (users may do this in 'Account Settings' in the UI). If desired, the generation of the JWTs can be performed elsewhere as is known in the art. In addition to the UI and the CLI tool, customers may develop their own applications that interface with the platform. In these scenarios, a "push" or "callback" model is used with the customer's API client (e.g., the application the customer is developing). API service 736 allows for a customer-supplied REST endpoint URL to be registered, along with a filter describing which events the customer's application has interest in. When events of these types are generated, the API server will make a REST PUT request to the customer's endpoint with the event data matching the filter supplied. To safeguard against misconfiguration or slow endpoints causing a potential DoS, successive failures or slow callbacks will result in the callback being removed from the API server, and a log message will be generated in the system log. The API server will also rate limit registration requests. API clients written in this fashion may de-register at any time using the same URL they registered with using the API server's de-registration API. Any registered API client may also be de-registered in the UI (XXX—Where?) or via the CLI tool.

Event Service 734 collects event telemetry from components 710. As explained above, each component has been instrumented to supply telemetry event information to TIAP 700. Upon receiving an event (or multiple events), event service 734 converts the event body into a record that is placed into the Events DB on the ClickHouse 742. Event service 734 can receive events via the Internet.

Analytics Service 737 can periodically survey the events collected by event service 734 and stored in the Events DB and attempts to gather insights based on the events that have been collected. Analytics service 737 is responsible for producing all alerts in the platform, as well as any suggested/ remedial corrective tasks. Analytics service 737 gathers events and performs analysis on a continual basis. Analytics service 737 can apply grammars to the collected events to determine whether an alert should be generated. Analytics service 737 can also apply various machine learning models to determine if a pattern of events is detected, and whether this pattern should be alerted. Any insight or alerts that are generated can be stored as a record in the analytics DB (e.g., Postgres 744). The analytics DB is queried by API service 736 when determining if an alert or insight is to be rendered to clients.

CVE Service 740 identifies which CVEs the components have known vulnerabilities. CVE service 740 can include CVEs that are created and maintained by TIAP 700. CVE service 740 can use a CVE database, which can be populated from a CVE pack. For example, the CVE database may include a snapshot or copy of various CVE databases that is updated on demand or at regular intervals. CVE service 740 can retrieve a list of CVEs from the CVE database. CVE service 740 periodically scans the event database and determines if any components are vulnerable to CVE. The CVE packs (database dumps) can be created manually by staff operating TIAP 700. This is a manual effort since CVE information is not released/published in a fashion that can be automatically queried. CVE susceptibility can be displayed in a UI hierarchy (e.g., CVE susceptibility is shown based on whatever view is currently active in the UI).

A housekeeping service (not shown) periodically performs cleanup of old data that is no longer required, including audit log data (after archival has been performed or at customer request), old telemetry events (retention time is per-customer specific), old alerts/insights (retention time is per-customer specific), and user accounts that have expired from any linked directory services.

TIAP 700 can maintain several databases in databases 744. An event database can contain all the telemetry received from all loaded applications/components, for all customers. The data in the events database is deposited by the event service and queried by the analytics, CVE, API, and blueprinting services. An insights/alerts database can contain all alerts and insights discovered by the analytics service, as it periodically analyzes data in the events database. Insights/alerts are deposited into the database along with information identifying which component instance (or application) the alert/insight pertains to. An audit log database contains a record of all platform actions performed by a user, for all users in a customer. These entries are generated by the API service as auditable events (changes, etc.) are made using any API offered by the API service. This also includes login/log out events and user profile related events (password changes, etc.). A user database contains information about local users defined for a tenant that are known to the platform. The user database also stores API tokens generated by users that are used by the API service for authentication. A configuration database stores any per-customer configuration information not previously described. This includes any information relating to third party integrations. The configuration database also stores portal-wide configuration used by TIAP systems administrators/operations teams.

TIAP 700 can provide a webhook platform for enabling a user to define a webhook to be used in conjunction with an application that is being monitored. For example, the user can use user interface 720 to cause intelligent webhook module 750 to operate according to embodiments discussed herein. The user may load a webhook via a helm chart that causes an intelligent webhook to be installed into the user's environment. After the intelligent webhook is installed, containers 760 can be processed according to admission control 752 and mutation control 754 and eventually passed through to instances/processes 710 of the application.

Figure 8:
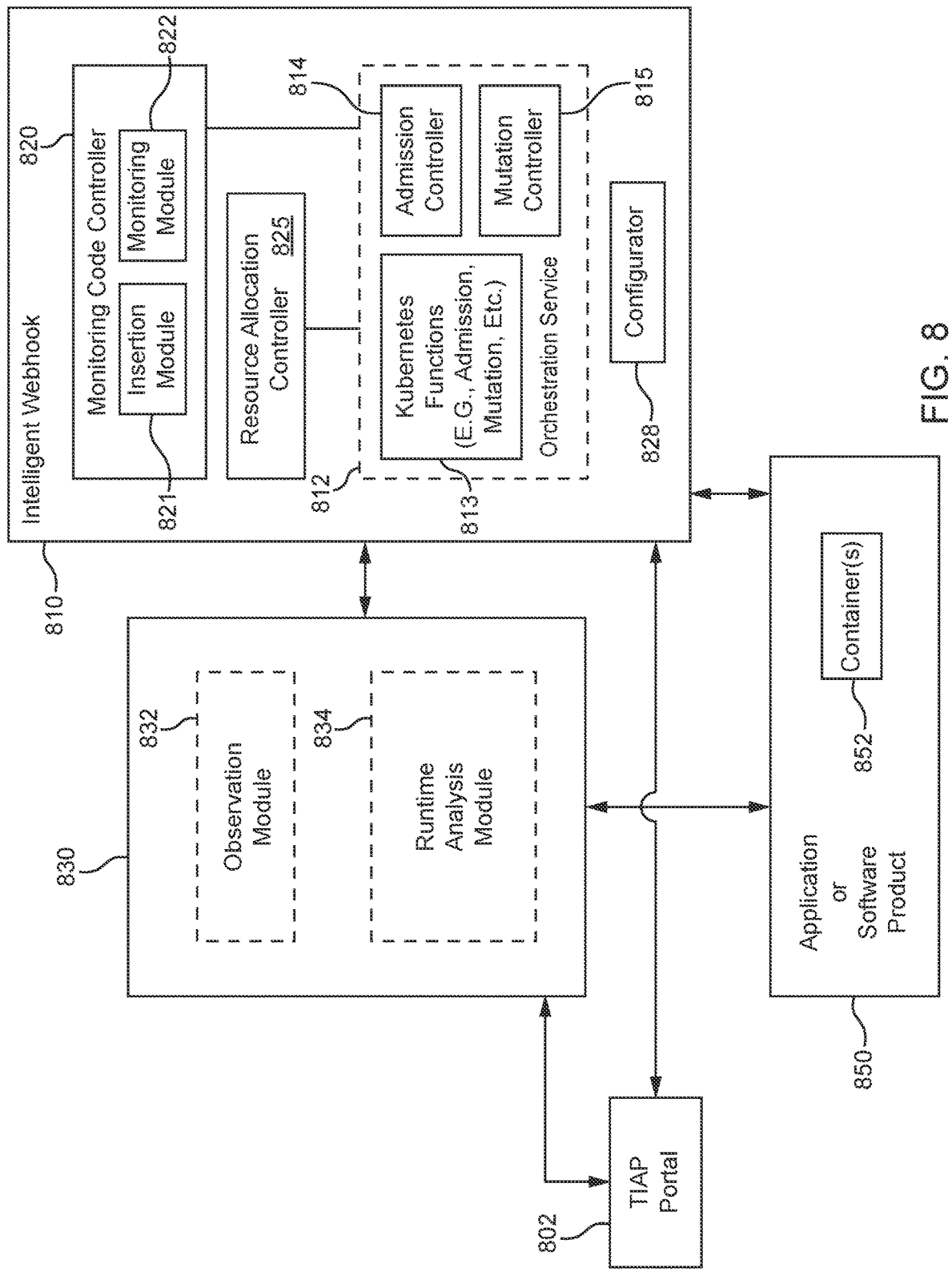
FIG. 8 shows an illustrative block diagram of an intelligent webhook in connection with an application or software product being observed or analyzed by observation or runtime analytics software, according to an embodiment.

FIG. 8 shows an illustrative block diagram of an intelligent webhook 810 in connection with an application or software product 830 being observed or analyzed by observation or runtime analytics software 850. Application or software product 830 may represent the software being analyzed or observed by observation module 832 or runtime analysis module 834 and includes one or more containers 852 that are processed/monitored by intelligent webhook 810. In some embodiments, observation or runtime analytics software 850 may be a TIAP, as described above, that instruments the application so that the TIAP can observe operations of the application and obtain analytics thereof. Application or software product 850 can include one or more containers 852 that are necessary for operation of the application. Image copies of containers 852 can be provided to intelligent webhook 810. Intelligent webhook 810 can include container orchestration service 812, which may orchestrate the use of containers 852 in accordance with an intelligent webhook's configuration. Container orchestration service 812 can be a Kubernetes module 813 that can provide Kubernetes functions such as admission and mutation. Kubernetes module 813 can be used in lieu of admission controller 815 and mutation controller 816. If Kubernetes module 813 is not used or not present, then orchestration service 812 may use admission controller 815 to gate admission of containers and mutation controller 816 to mutate containers.

Intelligent webhook 810 can include monitoring code controller 820, which can include code insertion module 821 and monitoring module 822. Monitoring code controller 820 can be responsible for incorporating one or more different instrumentations of webhook monitoring code into the container such that the container is mutated to include one of those instrumentations of webhook monitoring code. The monitoring code enables telemetry information related to operation of the container to monitored and stored. The telemetry information can be obtained from the inception of the startup of the container and throughout operation of the container until the container is closed or crashes. Many different monitoring codes variants may be available for use in mutating the container. The different monitoring codes may include different configurations to accommodate a wide variety of containers. In addition, the monitoring code can include different variations of monitoring capability. For example, one instance of monitoring code may include self-diagnostic code and container monitoring code, where the self-diagnostic code can self-assess whether the monitoring code is causing an issue for the container. As another example, the monitoring code can include only container monitoring code that is capable of monitoring telemetry data related to the container. Code insertion module 821 may be responsible for selecting the webhook monitoring code to be included into a mutated container. After the monitoring code is selected, module 821 may instruct Kubernetes module 812 or mutation controller 816 to modify a container to include that selected monitoring code. Monitoring module 822 may operate in connection with insertion module 821 and/or orchestration module 812 to monitor whether the inserted code was successfully incorporated into a mutated container. For example, monitoring module 812 may detect whether orchestration module 812 was able to successfully include the code and implement it without triggering a container cancellation (e.g., caused by out of bound resource usage).

After the code has been inserted into a container, and the resulting mutated container is not rejected by orchestration module 812, admission controller 815 may pass the mutated container to the local environment to execute the application using the mutated container. At this point, the application may run with the mutated container. Observation or run time analysis module 850 may begin its observation and/or run time analysis of the application. Observations and/or run time analysis can be provided to a TIAP, intelligent webhook 810, or both. If the application crashes using the mutated container, in one embodiment, this crash may be reported to monitoring code controller 820, or the application may attempt to call another instance of the container, at which point, controller 820 may detect this second instance and engage in the appropriate code insertion (e.g., a second instance of monitoring code) for the next instrumentation instance.

Intelligent webhook can include a configurator 828 that is able to automatically configure the intelligent webhook by accessing TIAP portal 802. Typically, a webhook originates as completely unconfigured and has no idea on what it should do. An operator typically has to hand-edit or create individual configuration files to define the role of the webhook. This can become very tedious when, for example, the webhook must work with fifty different host, each of which would require its own specific configuration file. Configurator 828 can access TIAP 802 to download the configurations associated with the host system and application (e.g., via a phone home operation) so that the webhook is configured to instrument one or more containers as specified by the TIAP. In this manner, the TIAP can be used to remotely configure webhooks. This can be advantageous because it allows a user to use the user interface of the TIAP to configure the webhook. The user can also set resource limits for the webhooks using the TIAP.

Intelligent webhook 810 can include resource allocation controller 825 that is operative to adjust resource restrictions set by the system, an application, an orchestration service, or a user. The resource restrictions may limit how much memory, hard-drive space, computational processing power is allocated for use by a container or application. When a container is mutated to include monitoring code and/or other webhook code, it is possible that inclusion of that additional code can result in a demand for resources that exceeds the resource limits. This resource demand can cause container orchestrator to prevent the webhook infused mutated container from operating. Resource code controller 820 can dynamically adjust resource allocation in anticipation of or in response to addition of webhook monitoring code into a container. The delta changes in resource allocation may be less than a predetermined percentage (e.g., 0.01%-1.0%) of the initial resource allocation. Controller 820 can dynamically step change the resource allocation each iteration cycle if mutated containers are being shut down due to resource constraints.

Figure 9A:
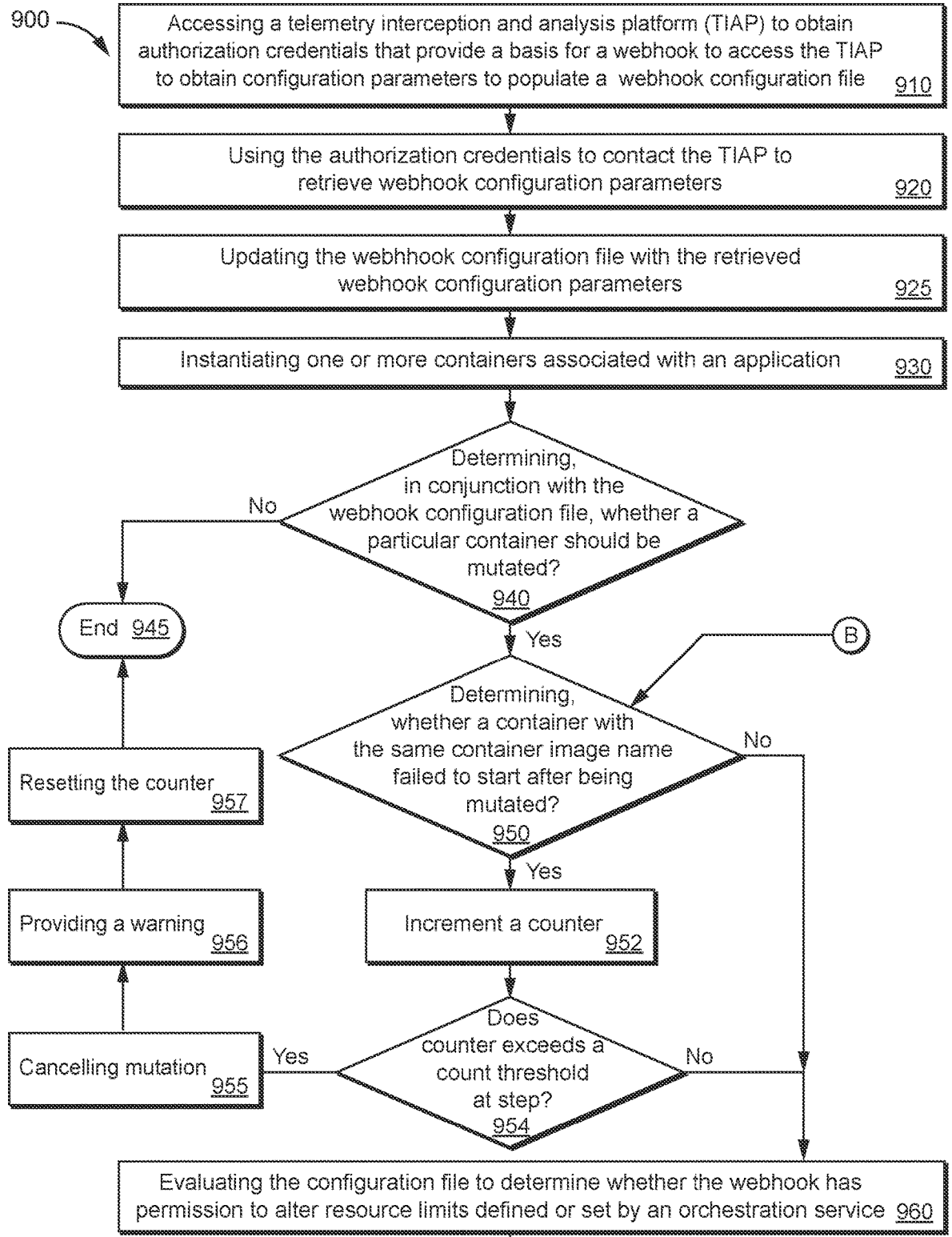
FIGS. 9A and 9B show an illustrative process for an intelligent webhook according to an embodiment.
Figure 9B:
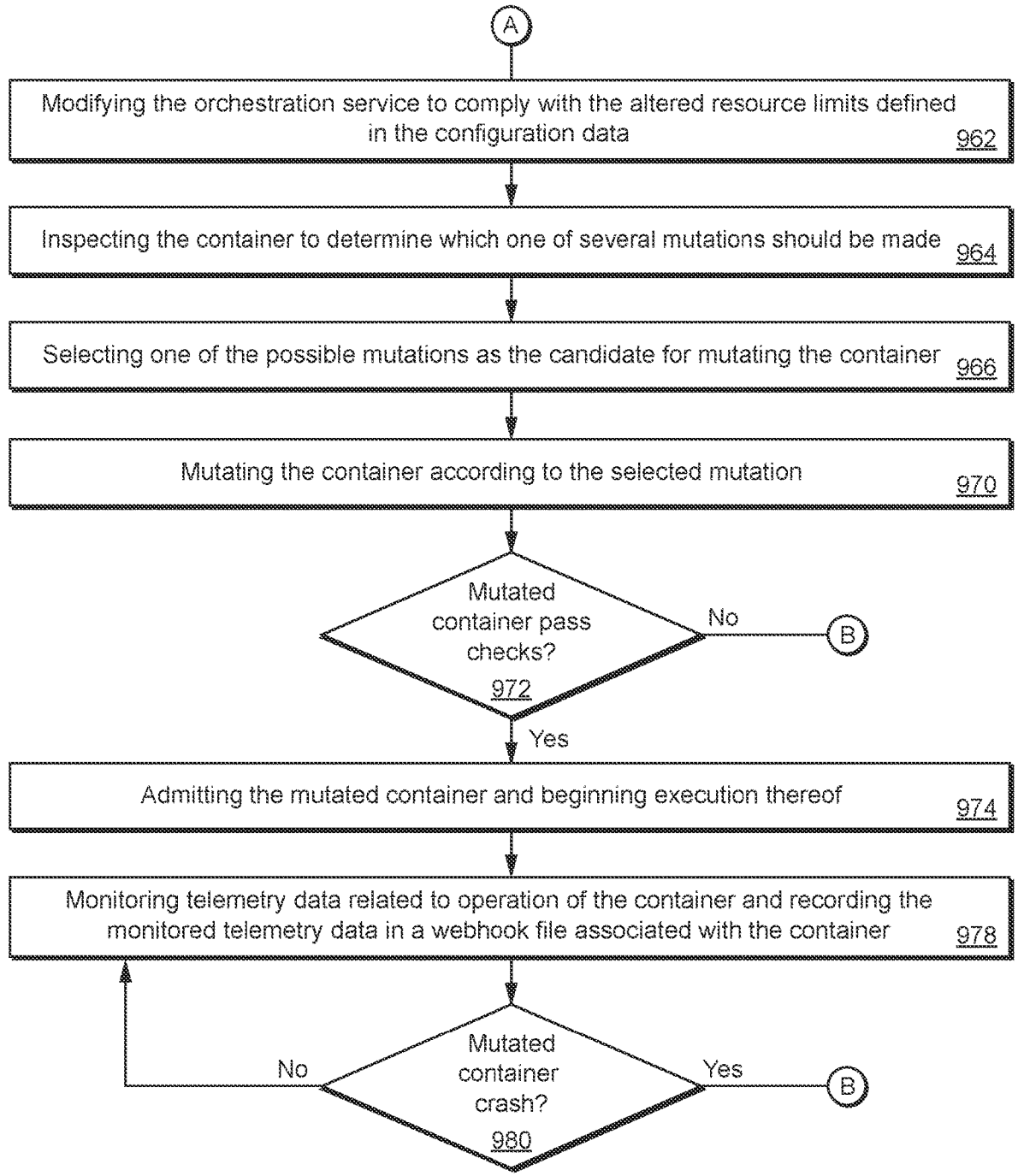

FIGS. 9A and 9B show an illustrative process 900 for an intelligent webhook according to an embodiment. Process 900 can start at step 910 by having a user access a TIAP portal to obtain authorization credentials that provide a basis for a webhook to access the TIAP to obtain the necessary configuration parameters to populate a webhook configuration file. The authorization credentials may be provided to an orchestration service (e.g., such as K8s helm command) during a webhook deployment operation. At step 920, the orchestration service can use the authorization credentials to contact the TIAP (e.g., via TLS/HTTPS) to retrieve webhook configuration parameters. An exemplary description of how parameters can be configured for a webhook are shown and described in connection with FIGS. 10A-10b. At step 925, the orchestration service can update the webhook configuration file with the retrieved webhook configuration parameters (e.g., using configurator 828). The webhook configuration file can specify which containers (or pods) can be mutated by the intelligent webhook.

At step 930, the orchestration service (e.g., K8s) may be instructed to instantiate one or more containers associated with an application. This can happen when the user deploys an application using the orchestration service's environment (e.g., a K8s environment using Helm). As part of the instantiation of the each container, the orchestration service can provide the (now dormant) webhook with container information such as a container image name, an orchestration module's namespace name (e.g., k8s namespace name), and an orchestrations service's cluster name (e.g., k8s cluster name).

At step 940, the webhook, in conjunction with the webhook configuration file, can determine whether a particular container should be mutated. For example, a pod in namespace A may be mutated based on configuration policy but a pod in namespace B may not be, based on the selections previously made to webhook configurations in the user interface of the TIAP. If the determination in step 940 is that the container should not be mutated, process 900 can end at step 945. In some embodiments, a message or warning can be transmitted by the webhook for display in the user interface of the TIAP that a particular container was container was not mutated or skipped.

If the determination in step 940 is that the container should be mutated, process 900 may proceed to step 950. At step 950, a determination is made whether a container with the same container image name failed to start after being mutated. This determination may indicate that the mutation has damaged the software inside the container in some way and that further mutation will result in a never ending cycle of start/restart. If the determination at step 950 is YES, process 900 may increment a counter at step 952 and check whether the counter exceeds a count threshold at step 954. If the counter is less than or equal to the count threshold, process 900 may continue to step 960, discussed below. If the counter exceeds the count threshold, the mutation of that particular container can be canceled (at step 955), a suitable warning message is communicated to the TIAP (at step 956), the counter is reset to zero at step 957, and process 900 ends when it proceeds to step 945.

If the determination at step 950 is NO, process 900 can proceed to step 960. At step 960 the configuration file is evaluated to determine whether the webhook has permission to alter resource limits defined or set by orchestration module. At step 962, the orchestration service can be modified to comply with the altered resource limits defined in in the configuration data. For example, resource allocation controller 825 may evaluate the configuration data and inform orchestration service 812 of any change to resource allocation constraints. As a specific example, if the user has limited the container to 1 GByte of memory, the webhook may choose to alter that limit to 1.1 GByte (i.e., 10% overhead) to account for the monitoring software being installed in the container. Similar resource adjustments can be used other resources, such as CPU usage, virtual memory usage, hard drive space, etc. The adjustments can be increased in "one shot" or gradually increased due to pod failure up to a maximum limit. If there is no configuration data dictating a change to resource limits, process 900 may bypass step 962 and proceed directly to step 964.

At step 964, the container is inspected to determine which one of several mutations should be made. For example, if the container image is based on one version of Linux, a certain version of the monitoring software should be injected, and if a different version of Linux is being used, an alternate version of the monitoring software should be used. At step 966, one of the possible mutations is selected as the candidate for mutating the container. In step 966, it is possible that no mutation is selected (e.g., if an unsupported container is detected) and a warning message can be sent to the TIAP.

Assuming that preceding checks pass, the container is mutated according to the selected one of the many possible mutations, at step 970. In one embodiment, the container can be mutated such that a container entry point executes the monitoring software as the first program to be executed in the container. Another program may have been set at the first program to be executed in the unmodified container, but the mutation has inserted monitoring software into the mutated container, and that other program may start after the monitoring software has successfully started.

At step 972, the mutated container is checked to confirm whether it passes an internal review before being admitted at step 974. If the checks do not pass, process 900 may revert back to step 950. If the check do pass, process 900 transitions to step 974

At step 974, the mutated container is admitted and starts execution in connection with the application. The mutated container may be admitted by an orchestration service (e.g., K8s 813 or admission controller 814).

At step 978, telemetry information related to operation of the container is monitored and/or recorded in a webhook file associated with the container. The monitored telemetry enables the start of the container to be recorded in addition to any events that occur after the container has started. If the container later crashes due to errors in the monitoring software, incompatibilities, or exceeding resource use, this information can be accessed during step 950 so that appropriate decisions can be made such as, for example, whether to adjust a mutation, cease mutations, adjust resource limits, or make any other necessary adjustments to account for unforeseen incompatibilities.

At step 980, a determination is made whether the mutated container crashed. If yes, then process 900 may revert back to step 940. If no, then process 900 may revert back to step 978.

It should be understood that the steps shown in FIGS. 9A and 9B are illustrative and that additional steps can be added, omitted, or rearranged in order of presentation. For example, if the mutated container is shut down (e.g., because the application does not need it anymore), process 900 may proceed to step 945.

Figure 10A:
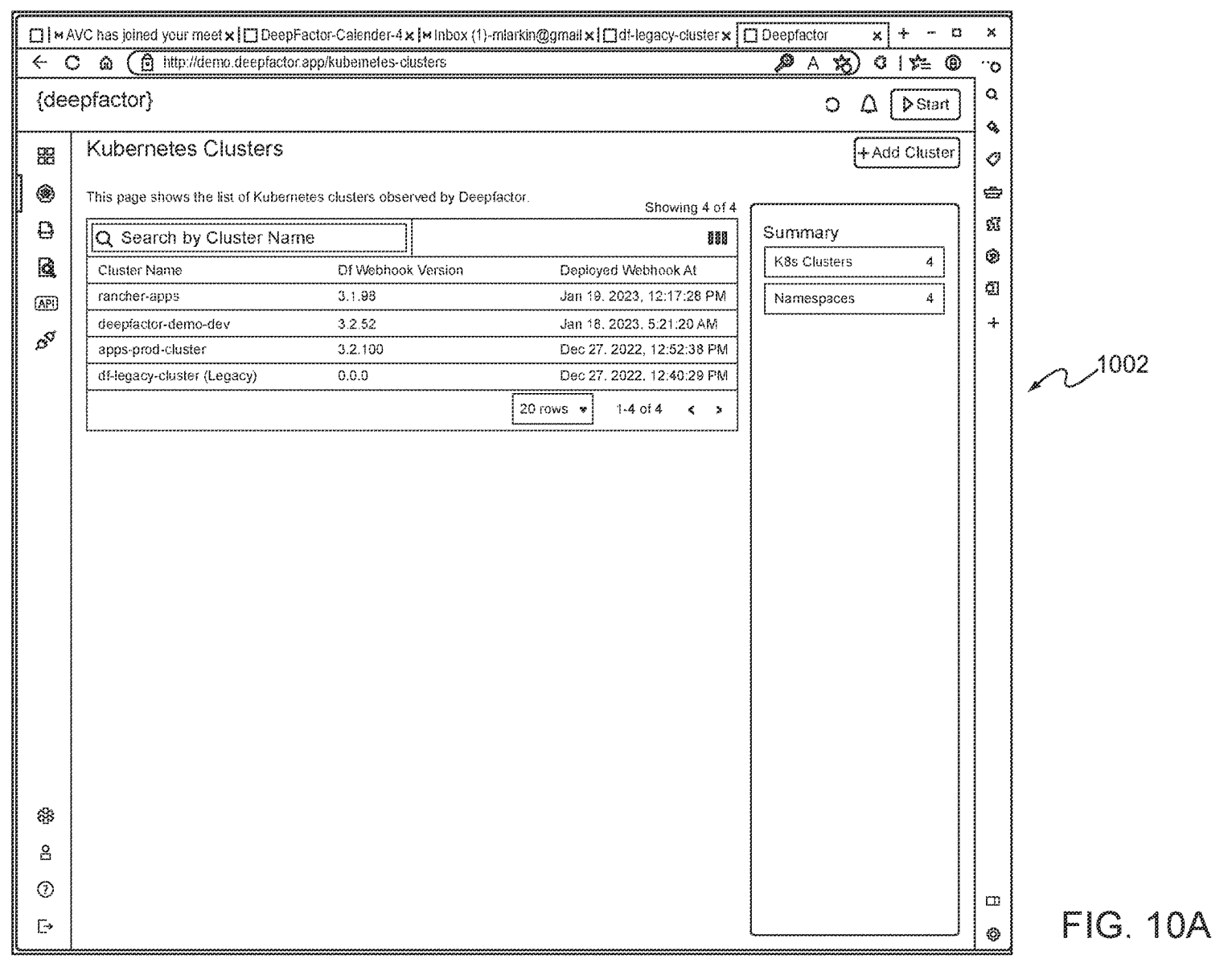
Figure 10B:
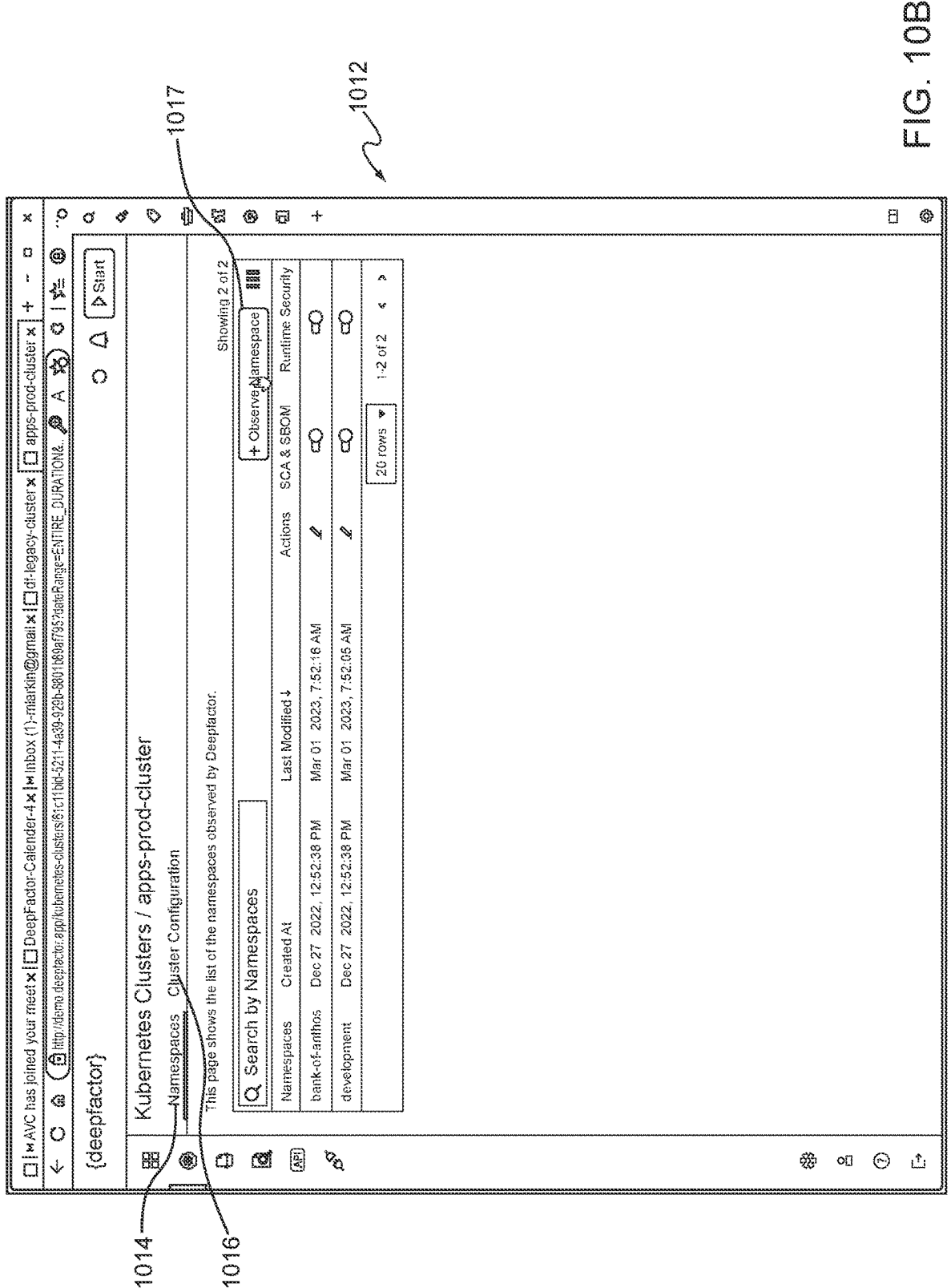
Figure 10C:
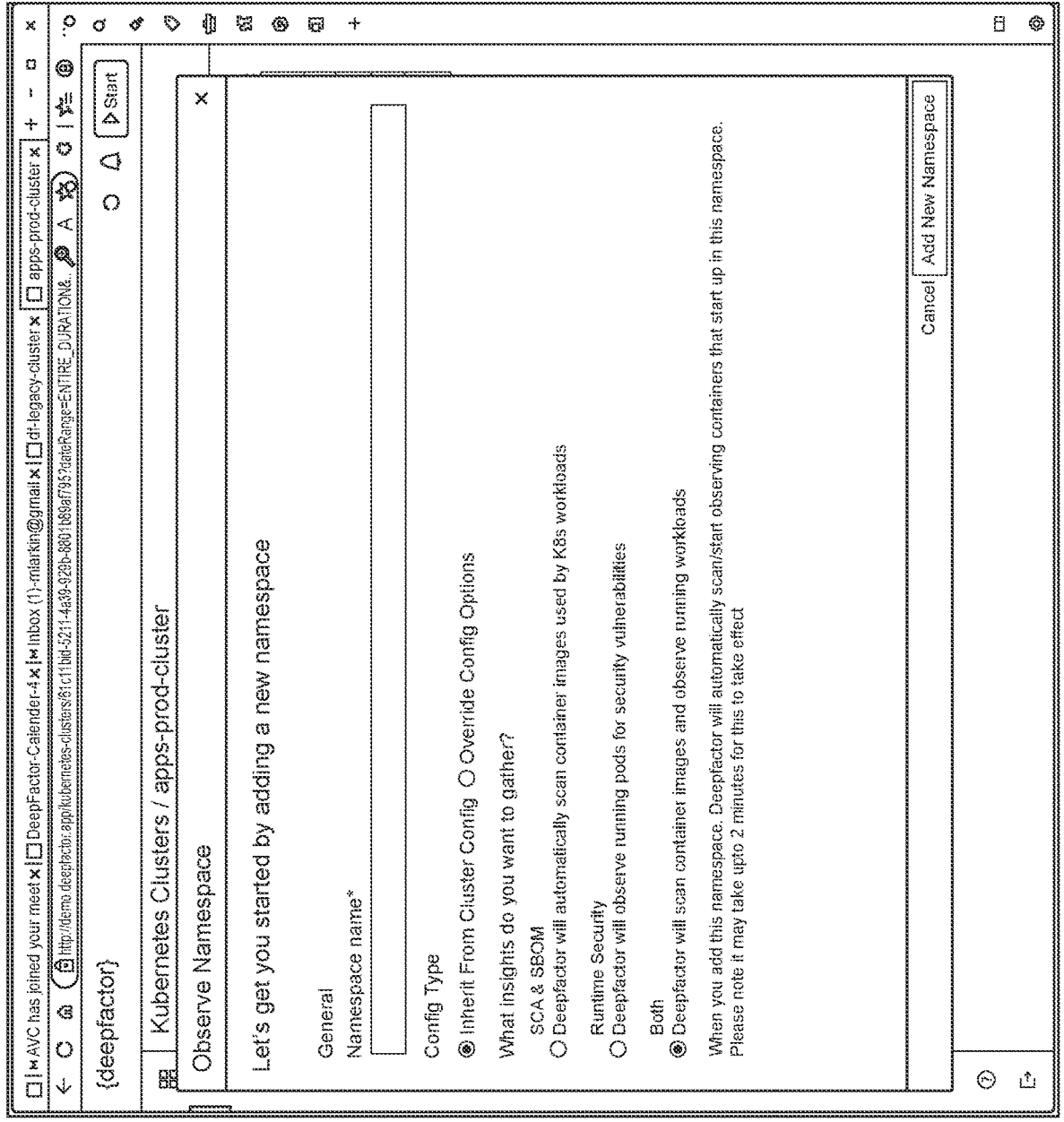
Figure 10D:
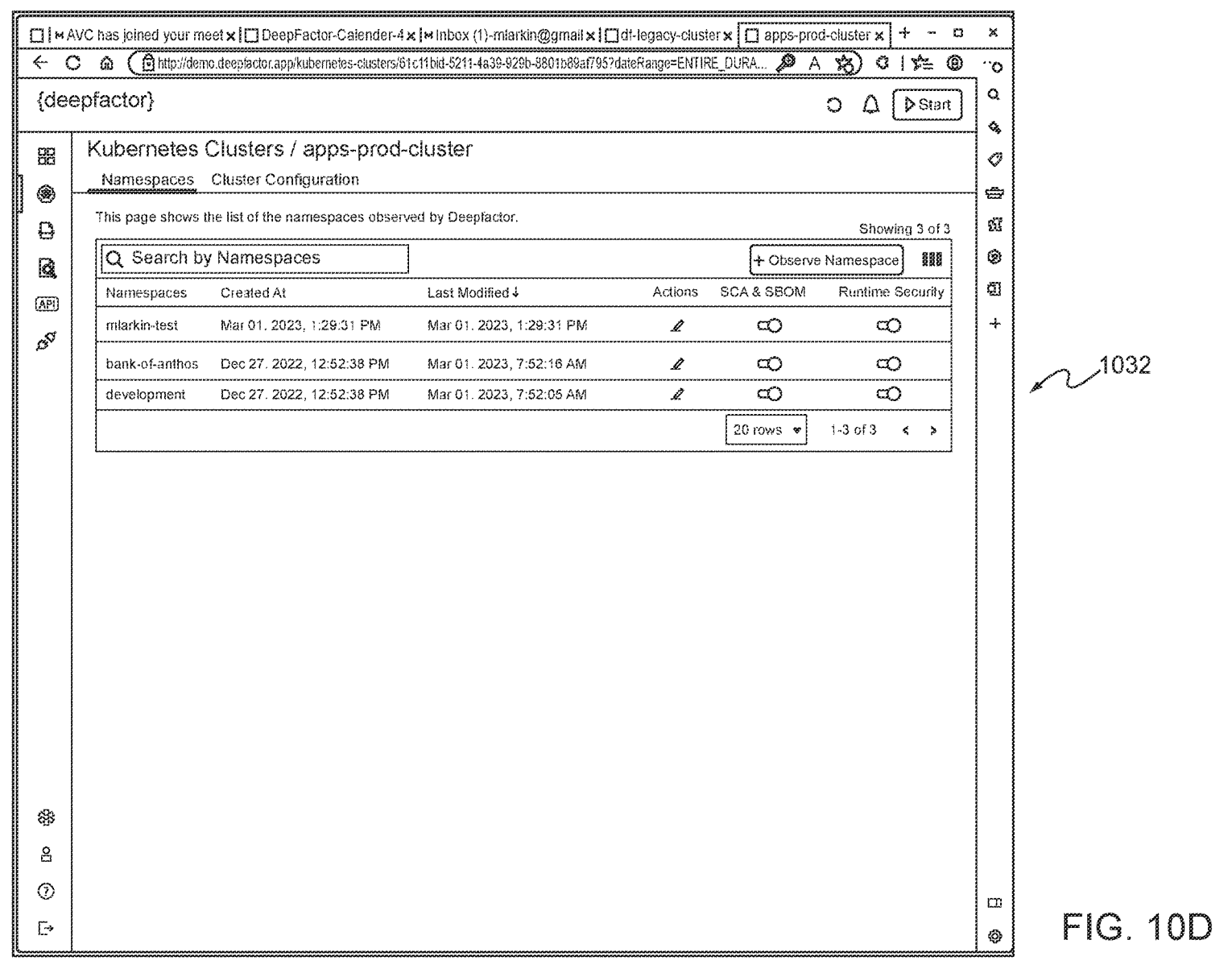

FIGS. 10A-10G show different UI screenshots in a TIAP portal that enables a user to define various configurations for a webhook according to an embodiment. The TIAP provides a GUI based configuration panel, allowing remote configuration of all webhooks deployed in this manner. The webhook may remain dormant until the customer subsequently deploys a new container into his or her orchestration (e.g., K8s) environment. FIG. 10A shows screen 1002 of various Kubernetes clusters being used by a user. If the user selects one of the Kubernetes clusters, screen 1012 of FIG. 10B can be displayed. Screen 1012 shows namespaces category 1014 and cluster configuration 1016. If the user selects observe namespace 1017, he or she can be presented with screen 1022 of FIG. 10C. Screen 1022 enables a user to define a new namespace with the Kubernetes cluster. The user can select a configuration type (e.g., inherit from cluster config or override config options) and which insights he or she wishes to gather (e.g., SCA and SBOM, Runtime Security, or both). After the new namespace is defined in screen 1022, screen 1032 of FIG. 10D may be displayed. Screen 1032 shows the new namespace "mlarkin-test" that was defined in screen 1022.

Figure 10E:
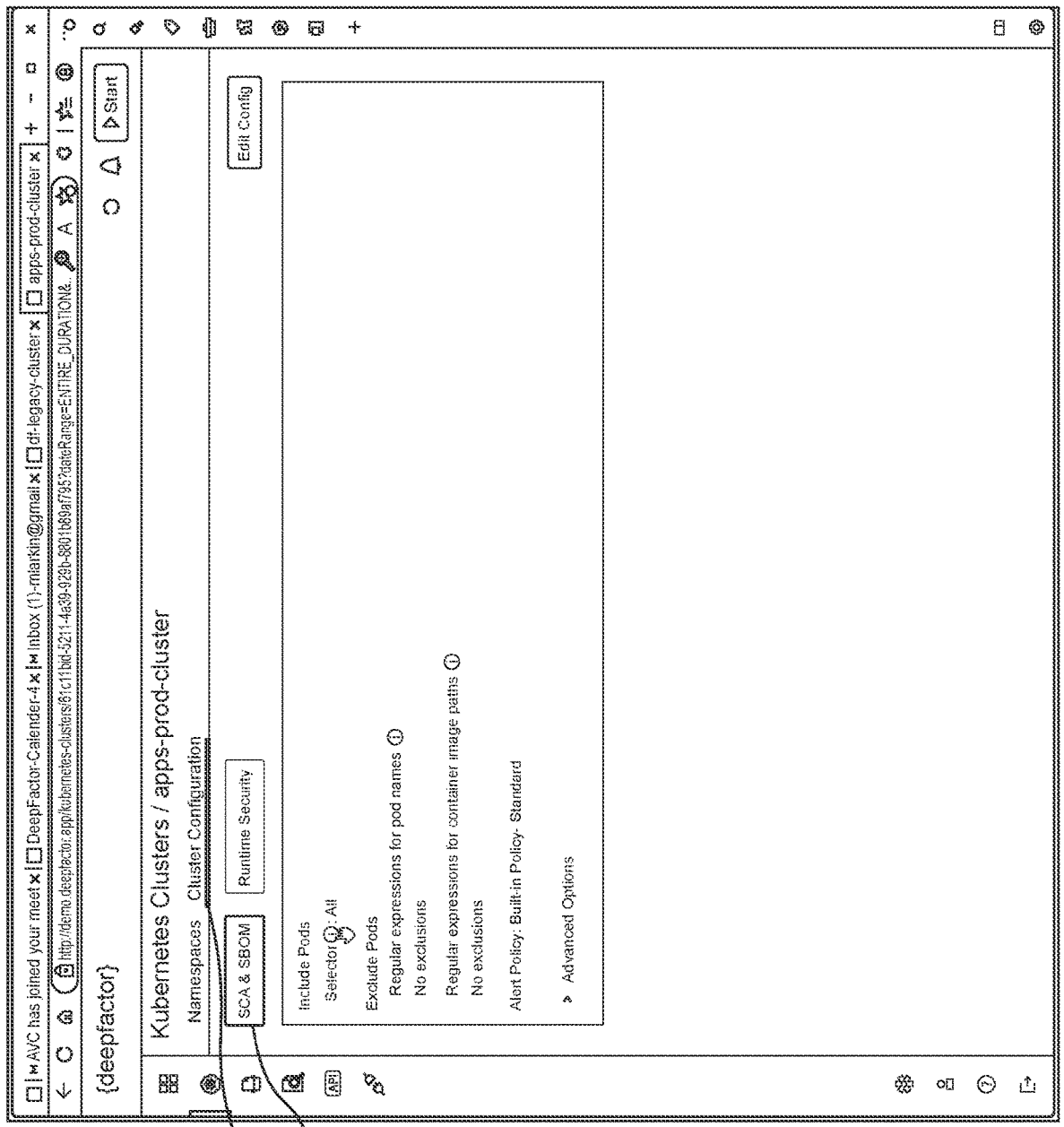
Figure 10F:
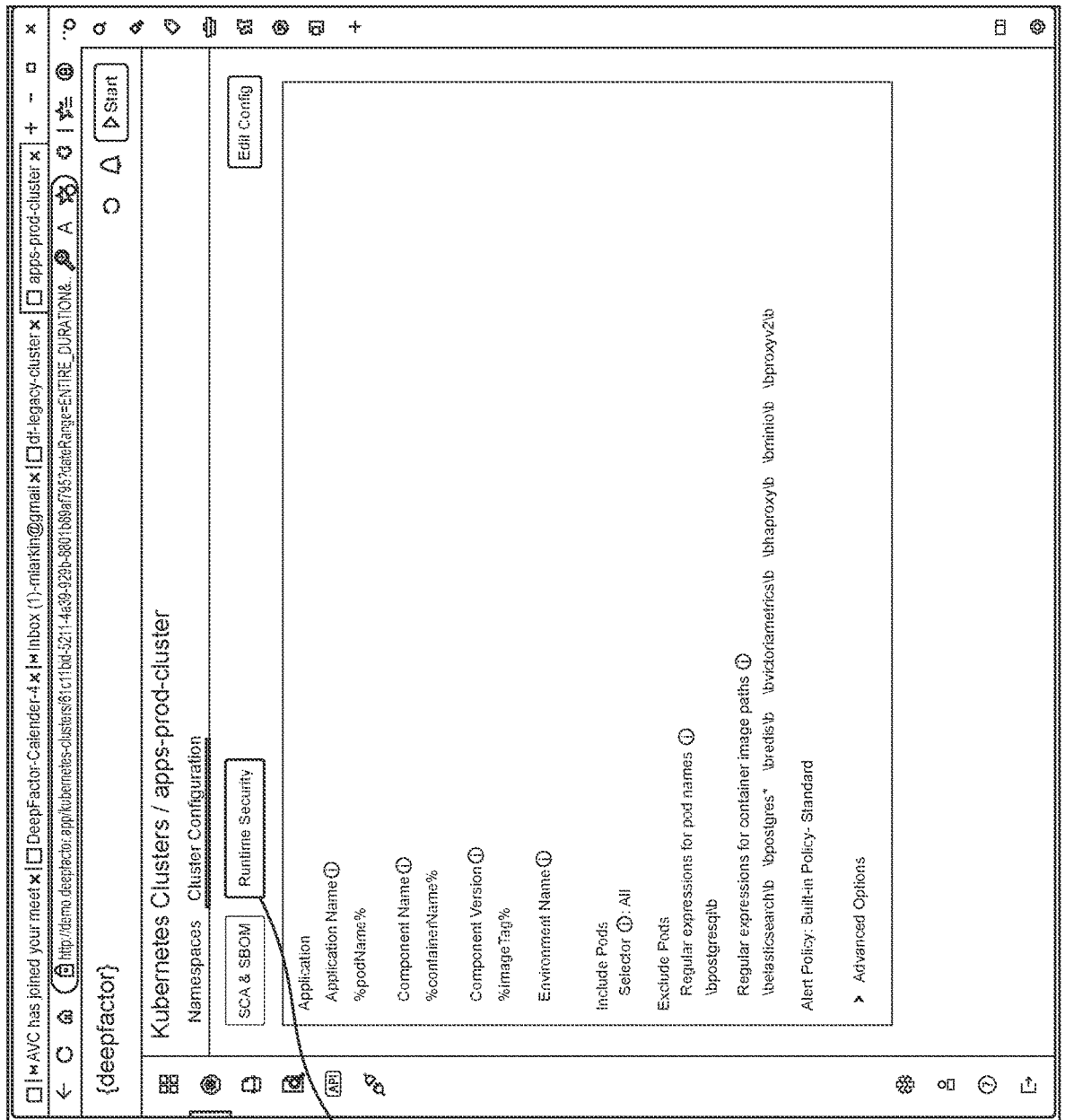
Figure 10G:
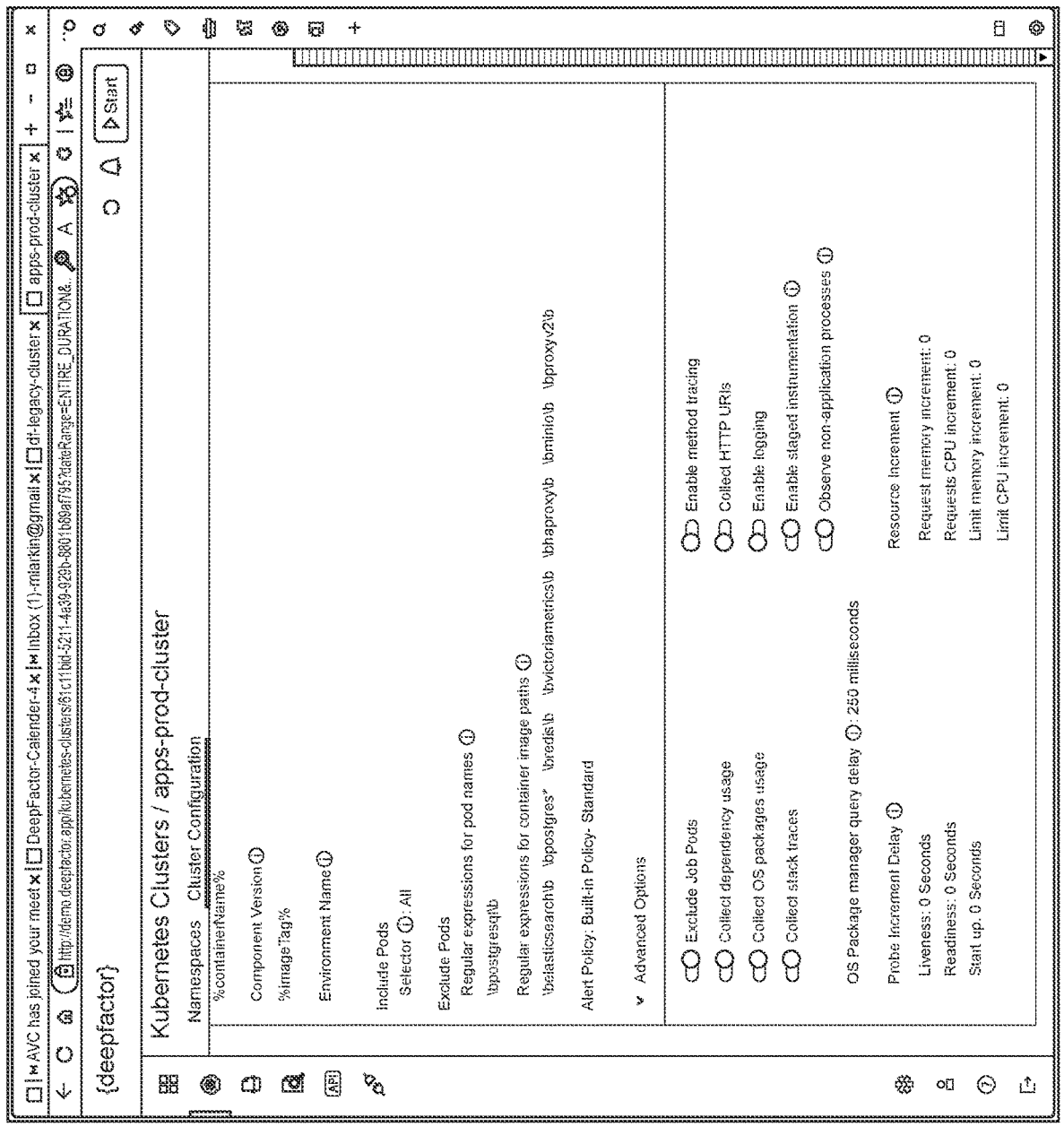

FIG. 10E shows screen 1042, which shows details related to Cluster Configuration 1016, with SCA & SBOM 1044 details. FIG. 10F shows screen 1052, which shows details related to Cluster Configuration 1016, with Runtime Security 1046 details. FIG. 10G shows screen 1062, which includes additional details related to runtime security 1046 details of FIG. 10F.

Figure 11:
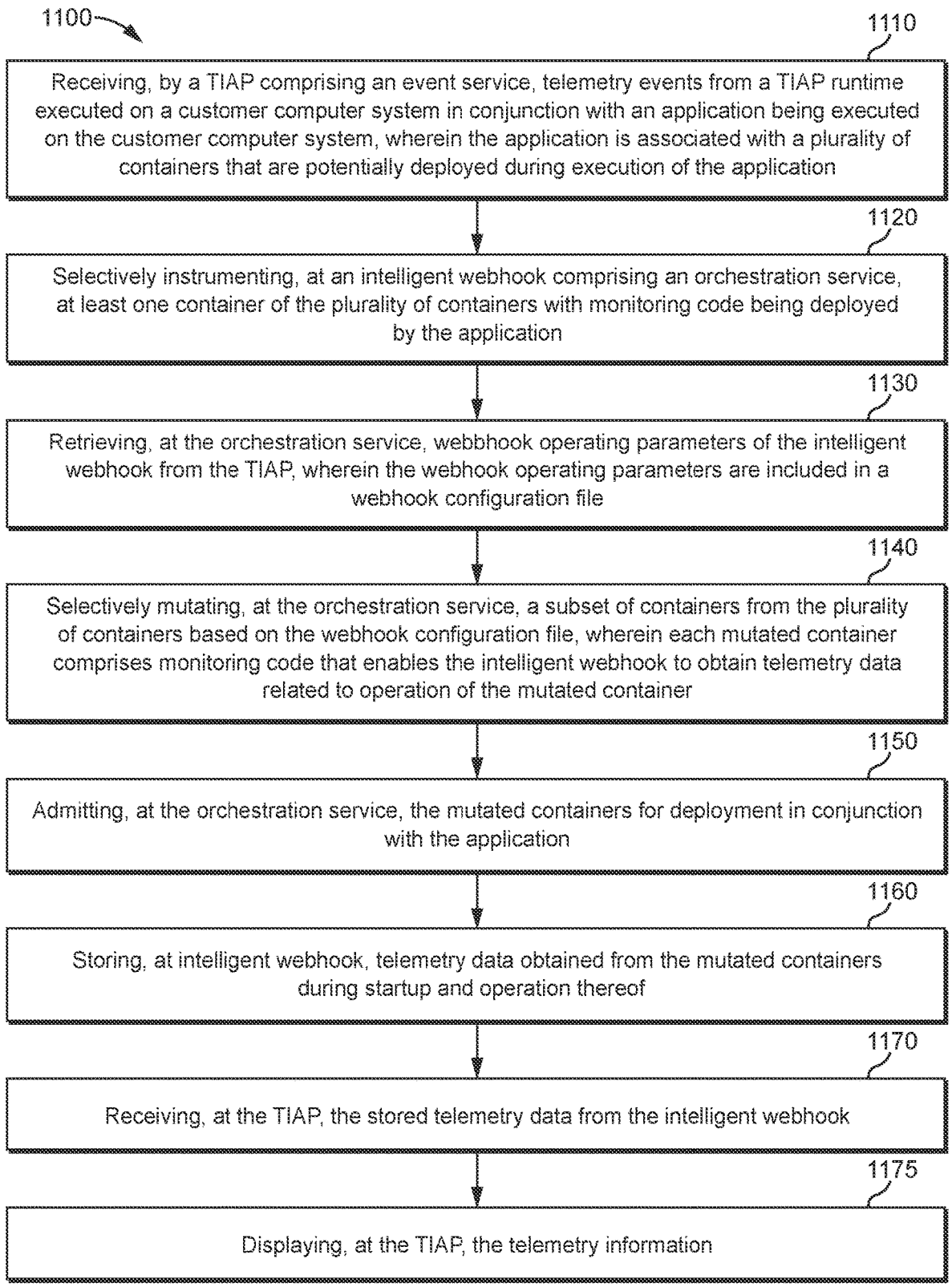
FIG. 11 shows an illustrative process of using an intelligent webhook in conjunction with a TIAP according to an embodiment.

FIG. 11 shows an illustrative process 1100 of using an intelligent webhook in conjunction with a TIAP according to an embodiment. Process 1100 can start at step 1110 by receiving, by a TIAP including an event service, telemetry events from a TIAP runtime being executed on a customer computer system in conjunction with an application being executed on the customer computer system, wherein the application is associated with a plurality of containers that are potentially deployed during execution of the application. At step 1120, process 1100 can selectively instrument, at an intelligent webhook comprising an orchestration service, at least one container of the plurality of containers with monitoring code being deployed by the application. At step 1130, process 1100 can retrieve, at the orchestration service, webhook operating parameters of the intelligent webhook from the TIAP, wherein the webhook operating parameters are included in a webhook configuration file. At step 1140, process 1100 can selectively mutate, at the orchestration service, a subset of containers from the plurality of containers based on the webhook configuration file, wherein each mutated container comprises monitoring code that enables the intelligent webhook to obtain telemetry data related to operation of the mutated container. At step 1150, process 1100 can admit, at the orchestration service, the mutated containers for deployment in conjunction with the application. At step 1160, process 1100 can store, at the intelligent webhook, telemetry data obtained from the mutated containers during startup and operation thereof. At respective steps 1170 and 1175, process can receive, at the TIAP, the stored telemetry data from the intelligent webhook, and display, at the TIAP, the telemetry information.

It should be understood that the steps shown in FIG. 11 are illustrative and that additional steps may be added, existing steps may be omitted, or the order of the steps can be rearranged. For example, process 11 may receive, at the TIAP, user commands to remotely configure the intelligent webhook by defining the webhook operating parameters.

Figure 12A:
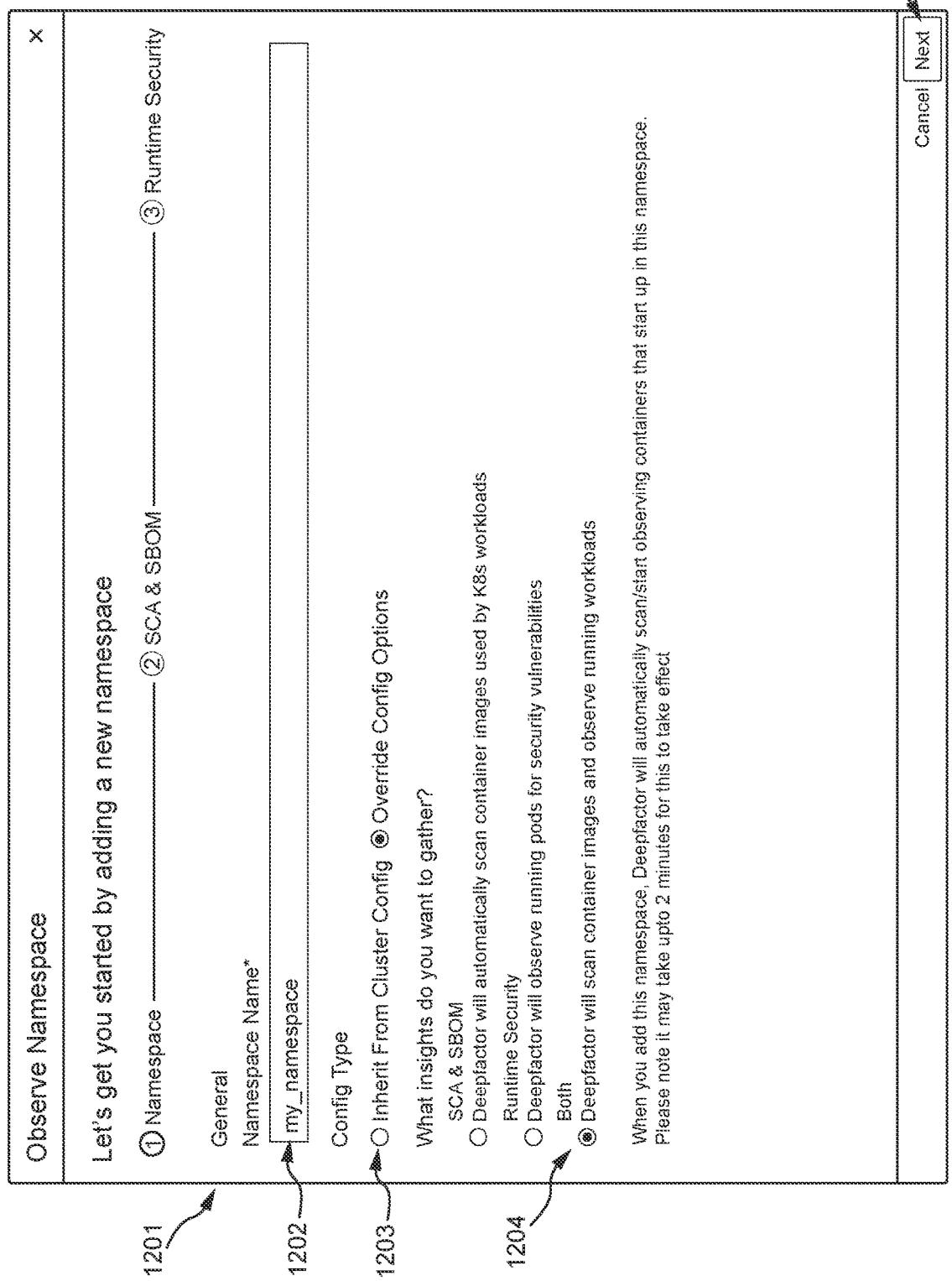
Figure 12C:
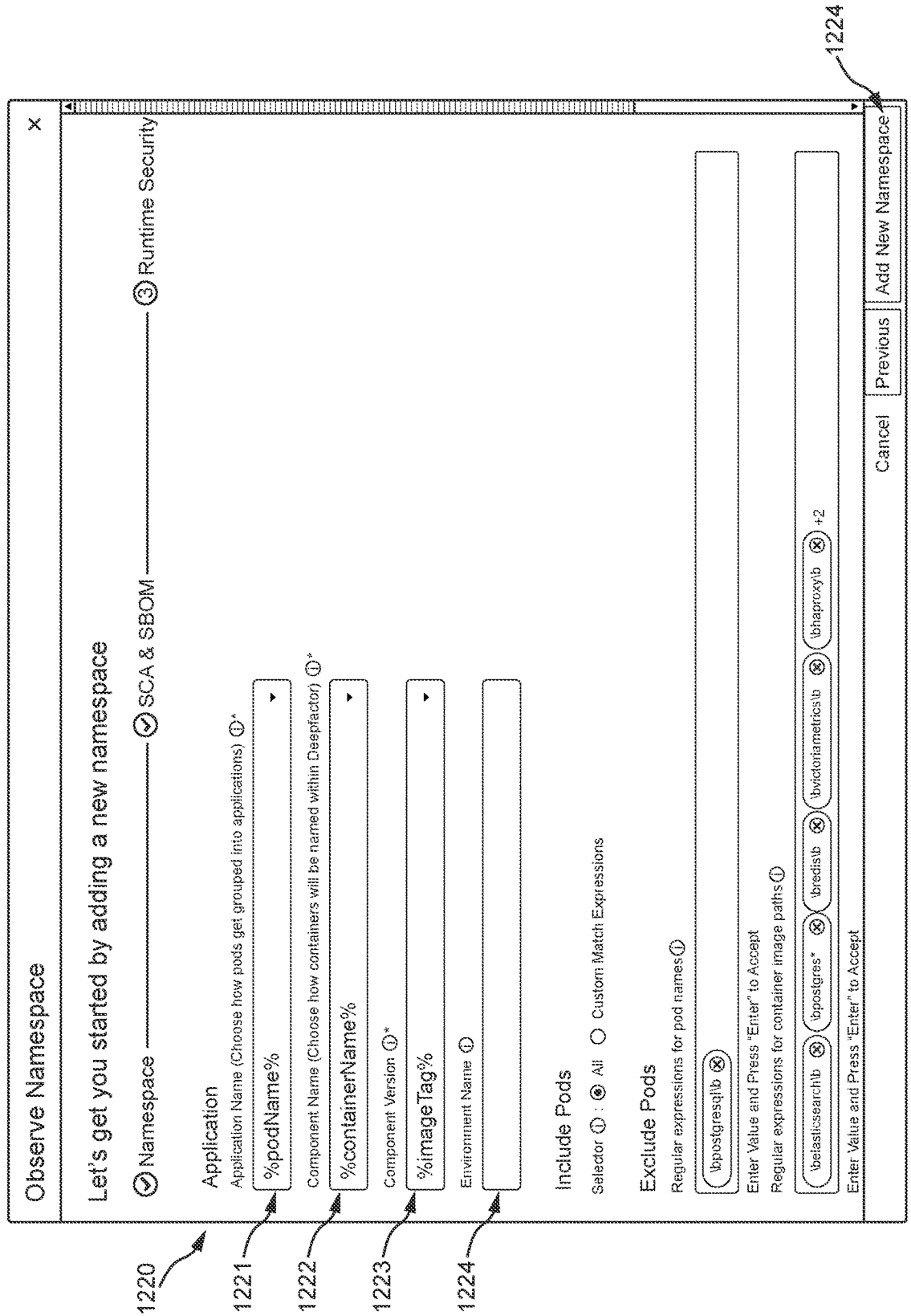

FIGS. 12A-12C show different UI screenshots of setting up a webhook in a TIAP according to an embodiment. FIG. 12A shows namespace screen 1201 in which a user can define a namespace via interface 1202, select a configuration type in interface 1203, and select type of insights to gather in interface 1204. When the new namespace is added, the webapp module can automatically observe containers that start up in this namespace. When the user selects next icon 1206, SCA & SBOM screen 1210 is provided in FIG. 12B. In screen 1210, the user can define pods or containers to be included in the namespace by specifying the label, the operator, and optionally, the value. The user can also exclude pods by providing regular expressions for pod names and for container image paths. The user can select an alert policy via a drop down menu. When the user selects next icon 1218, runtime security screen 1220 is displayed in FIG. 12C. In screen 1220, the user can define an application name (to choose how pods are grouped into applications) at 1221, define component names (to choose how containers will be named within the TIAP) at 1222, define component vectors at 1223, environment names at 1224. The user can specify which pods to include and exclude. The user can select add new namespace icon 1228 to create the webhook.

In some embodiments, a data processing system may be provided to include a processor to execute instructions, and a memory coupled with the processor to store instructions that, when executed by the processor, may cause the processor to perform operations to generate an API that may allow an API-calling component to perform at least some of the operations of one or more of the processes described with respect to one or more of FIGS. 1-12. In some other embodiments, a data processing system may be provided to include a memory to store program code, and a processor to execute the program code to generate an API that may include one or more modules for performing at least some of the operations of one or more of the processes described with respect to one or more of FIGS. 1-12. In yet some other embodiments, a machine-readable storage medium may be provided that provides instructions that, when executed by a processor, cause the processor to generate an API that allows an API-implementing component to perform at least some of the operations of one or more of the processes described with respect to one or more of FIGS. 1-12. In yet some other embodiments, a data processing system may be provided to include an API-implementing component, and an API to interface the API-implementing component with an API-calling component, wherein the API may include one or more modules or means for performing at least some of the operations of one or more of the processes described with respect to one or more of FIGS. 1-12. In yet some other embodiments, a data processing system may be provided to include a processor to execute instructions, and a memory coupled with the processor to store instructions that, when executed by the processor, cause the processor to perform operations to generate an API-implementing component that implements an API, wherein the API exposes one or more functions to an API-calling component, and wherein the API may include one or more functions to perform at least some of the operations of one or more of the processes described with respect to one or more of FIGS. 1-12. In yet some other embodiments, a data processing system may be provided to include a processor to execute instructions, and a memory coupled with the processor to store instructions that, when executed by the processor, cause the processor to interface a component of the data processing system with an API-calling component and to perform at least some of the operations of one or more of the processes described with respect to one or more of FIGS. 1-12. In yet some other embodiments, an apparatus may be provided to include a machine-readable storage medium that provides instructions that, when executed by a machine, cause the machine to allow an API-calling component to perform at least some of the operations of one or more of the processes described with respect to one or more of FIGS. 1-12.

Moreover, the processes described with respect to one or more of FIGS. 1-12, as well as any other aspects of the disclosure, may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and optical data storage devices. In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of any one or more of any system, device, or server may be provided as a software construct, firmware construct, one or more hardware components, or a combination thereof, and may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of any one or more of any system device, or server are merely illustrative, and that the number, configuration, functionality, and interconnection of existing modules may be modified or omitted, additional modules may be added, and the interconnection of certain modules may be altered.

While there have been described systems, methods, and computer-readable media for enabling efficient control of a media application at a media electronic device by a user electronic device, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A system, comprising:
  a server, comprising a processor, for running an intelligent webhook comprising a configurator to define webhook operating parameters of the intelligent webhook, wherein the webhook operating parameters are included in a webhook configuration file, and an orchestration service operative to selectively instrument at least one container of a plurality of containers associated with an application being deployed by the orchestration service and being executed on a customer computer system;
  wherein the orchestration service is operative to:
    determine whether a first container of the plurality of containers should be mutated;
    in response to a determination to mutate the first container:
      select a first mutation from a plurality of mutations to be applied to the first container;
      mutate the first container based on the first mutation to provide a first mutated container, wherein the first mutated container comprises monitoring code that is the first program to be executed in the first mutated container;
      admit the first mutated container to be used conjunction with the application; and
    wherein the intelligent webhook further comprises a monitoring code controller operative to:
    monitor telemetry information related to the operation of the first mutated container during startup and throughout operation thereof if the first mutated container does not crash;
    detect that the first mutated container crashed on startup;
    instruct a resource allocation controller to alter resource constraints, wherein the resource allocation controller instructs the orchestration service to increase resources by a fixed quantity; and
    re-admit the first mutated container after the resource allocation has been increased by the fixed quantity.

2. The system of claim 1, wherein the monitored telemetry information is displayed on a user computer.

3. The system of claim 1, wherein the monitoring code controller is operative to record all telemetry information related to operation of the first mutated container.

4. A system, comprising:
  a server, comprising a processor, for running an intelligent webhook comprising a configurator to define webhook operating parameters of the intelligent webhook, wherein the webhook operating parameters are included in a webhook configuration file, and an orchestration service operative to selectively instrument at least one container of a plurality of containers associated with an application being deployed by the orchestration service and being executed on a customer computer system;
  wherein the orchestration service is operative to:
    determine whether a first container of the plurality of containers should be mutated;
    in response to a determination to mutate the first container:
      select a first mutation from a plurality of mutations to be applied to the first container;
      mutate the first container based on the first mutation to provide a first mutated container, wherein the first mutated container comprises monitoring code that is the first program to be executed in the first mutated container;
      admit the first mutated container to be used conjunction with the application; and
    wherein the intelligent webhook further comprises a monitoring code controller operative to:
      monitor telemetry information related to the operation of the first mutated container during startup and throughout operation thereof if the first mutated container does not crash;
      detect that the first mutated container crashed on startup;
      instruct monitoring code controller to install a second mutation into the first container to provide a second mutated container for admission by the orchestration service; and admit the second mutated container to be used in conjunction with the application.

5. The system of claim 1, in response to a determination to mutate the first container, the orchestration service is further operative to:
evaluate the webhook container image to determine whether a resource allocation controller has permission to alter resource limits set by the orchestration service; and
modify the resource limits set by the orchestration service when the resource allocation controller is determined to have permission to alter resource limits.

6. The system of claim 5, wherein modification of the resource limits is a stepwise incremental change or wherein modification of the resource limits is a one-time max change.

7. The system of claim 1, wherein when the orchestration service is operative to determine whether the first container should be mutated, the orchestration service if further operative to:
assess whether the first container failed to start after being mutated in a previous instrumentation cycle;
increment a counter if the first container failed to start after being mutated in a previous instrumentation cycle; and
if the counter is more than a count threshold, cancel further mutation attempts of the first container.

8. The system of claim 1, wherein when the orchestration service is operative to determine whether the first container should be mutated, the orchestration service if further operative to:
confirm that the first container failed to start after being mutated in a previous instrumentation cycle, wherein the mutation is a second mutation instance of the first container, and wherein the second mutation instance includes different software than a first mutation instance of the first container;
increment a counter after said confirmation; and
if the counter is more than a count threshold, cancel further mutation attempts of the first container.

9. The system of claim 1, if the first container is determined not to be mutated, the orchestration service is operative to inform a user that the first container cannot be mutated.

10. The system of claim 1, wherein the configurator is operative to periodically download the operating parameters from a telemetry interception and analysis platform (TIAP) system.

11. A system, comprising:
a first server comprising a first processor to run a telemetry interception and analysis platform (TIAP) comprising an event service operative to receive telemetry events from a TIAP runtime being executed on a customer computer system in conjunction with an application being executed on the customer computer system, wherein the application is associated with a plurality of containers that are potentially deployed during execution of the application; and
a second server comprising a second processor to run an intelligent webhook comprising an orchestration service operative to selectively instrument at least one container of a plurality of containers with monitoring code being deployed by the application;
wherein the orchestration service is operative to:
retrieve webhook operating parameters of the intelligent webhook from the TIAP, wherein the webhook operating parameters are included in a webhook configuration file;
selectively mutate a subset of containers from the plurality of containers based on the webhook configuration file, wherein each mutated container comprises monitoring code that enables the intelligent webhook to obtain telemetry data related to operation of the mutated container;
admit the mutated containers for deployment in conjunction with the application; and
store telemetry data obtained from the mutated containers during startup and operation thereof;
wherein the intelligent webhook further comprises a monitoring code controller operative to:
detect that a first mutated container crashed on startup, wherein the first mutated container originated as a first container;
instruct monitoring code controller to install a second mutation into the first container to provide a second mutated container for admission by the orchestration service; and
admit the second mutated container to be used in conjunction with the application.

12. The system of claim 11, wherein the TIAP is operative to receive stored telemetry data from the intelligent webhook, and wherein the TIAP portal is further operative to display the telemetry information.

13. The system of claim 11, wherein the TIAP is operative to receive user commands to remotely configure the intelligent webhook by defining the webhook operating parameters.

14. The system of claim 11, wherein the intelligent webhook further comprises a resource allocation controller operative to adjust resource constraints imposed by the orchestration service based on the webhook configuration file.

15. A system, comprising:
a first server comprising a first processor to run a telemetry interception and analysis platform (TIAP) comprising an event service operative to receive telemetry events from a TIAP runtime being executed on a customer computer system in conjunction with an application being executed on the customer computer system, wherein the application is associated with a plurality of containers that are potentially deployed during execution of the application; and
a second server comprising a second processor to run an intelligent webhook comprising an orchestration service operative to selectively instrument at least one container of a plurality of containers with monitoring code being deployed by the application;
wherein the orchestration service is operative to:
retrieve webhook operating parameters of the intelligent webhook from the TIAP, wherein the webhook operating parameters are included in a webhook configuration file;
selectively mutate a subset of containers from the plurality of containers based on the webhook configuration file, wherein each mutated container comprises monitoring code that enables the intelligent webhook to obtain telemetry data related to operation of the mutated container;
admit the mutated containers for deployment in conjunction with the application; and store telemetry data obtained from the mutated containers during startup and operation thereof;

wherein the intelligent webhook further comprises a monitoring code controller operative to:

detect that a first mutated container crashed on startup;

instruct a resource allocation controller to alter resource constraints, wherein the resource allocation controller instructs the orchestration service to increase resources by a fixed quantity; and re-admit the first mutated container after the resource allocation has been increased by the fixed quantity.

16. The system of claim 11, wherein the intelligent webhook further comprises a monitoring code controller operative to:

insert the monitoring code into a respective container such the monitoring code is the first program to be executed when the mutated container is executed.

* * * * *